(12) United States Patent
Ebara

(10) Patent No.: US 6,429,273 B1
(45) Date of Patent: Aug. 6, 2002

(54) PROCESS FOR THE PREPARATION OF VINYLIC POLYMERS, POLYMERIZATION INITIATOR FOR VINYLIC MONOMERS, AND STYRENE RESIN COMPOSITION

(75) Inventor: Kenji Ebara, Yokohama (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 0 days.

(21) Appl. No.: 09/142,661

(22) PCT Filed: Mar. 13, 1997

(86) PCT No.: PCT/JP97/00796

§ 371 (c)(1),
(2), (4) Date: Sep. 14, 1998

(87) PCT Pub. No.: WO97/33923

PCT Pub. Date: Sep. 18, 1997

(30) Foreign Application Priority Data

| Mar. 14, 1996 | (JP) | ............................................. 8-084474 |
| Oct. 30, 1996 | (JP) | ............................................. 8-303483 |
| Oct. 30, 1996 | (JP) | ............................................. 8-303484 |

(51) Int. Cl.$^7$ .............................. C08F 12/08; C08F 4/50
(52) U.S. Cl. ...................... 526/346; 526/173; 526/180; 526/181; 526/183; 502/153; 502/155; 502/156; 502/157
(58) Field of Search .............................. 526/173, 180, 526/181, 183, 346; 502/153, 157, 155, 156; 260/665 R

(56) References Cited

U.S. PATENT DOCUMENTS

| 3,716,495 A | | 2/1973 | Hsieh |
| 3,822,219 A | | 7/1974 | Kamienski et al. |
| 3,847,883 A | | 11/1974 | Kamienski et al. |
| 4,672,097 A | | 6/1987 | Hall |
| 5,162,476 A | * | 11/1992 | Hisatani et al. ......... 526/183 X |
| 5,623,035 A | * | 4/1997 | Halasa et al. ............... 526/183 |

FOREIGN PATENT DOCUMENTS

| DE | 03784748 T2 | 8/1993 |
| EP | A 2-754705 | 1/1997 |
| JP | 61207 A | 6/1986 |
| JP | A 7-18012 | 1/1995 |
| RU | 2061704 C1 | 6/1996 |

OTHER PUBLICATIONS

H. Ito et al., Macromolecules, pp. 22, 45–51, vol. 110, zitiert als Chemical Abstract No. 58131 (1989).
M. Liu et al., J. Macromol. Sci. Chem., pp. A23, 1387–1396 (1986).
H. L. Hsieh et al., Macromolecules, pp. 19, 299–304 (1986).
L. N. Moskalenko et al., Dokl. Akad. Nauk SSSR, vol. 195, No. 6, pp. 1370–1372, (Phys. Chem.) Chemical Abstract, No. 65200 (1970).
Vysikomolekulyarnye Soedineniya Seriya B, 32(8) (1990), (Russia),pp. 616–619.
Alain Soum, et al "Journal of Polymer Science: Polymer Chemistry Edition", vol. 15 No. 3 Mar. 1977, pp. 659–673.
Yasushi Joh, et al "Journal of Polymer Science: Polymer Chemistry", vol. 5 No. 3, Mar. 1967, pp. 605–617.

* cited by examiner

*Primary Examiner*—Fred Teskin
(74) *Attorney, Agent, or Firm*—Birch, Stewart, Kolasch & Birch, LLP

(57) ABSTRACT

A process for producing a vinyl polymer which comprises carrying out anionic polymerization under the condition that the polymerization temperature is not lower than 45° C. and not higher than 250° C. and the concentration of the vinyl monomer based on the polymerization solvent is 45–100% by weight, wherein the metal of the cation forming a counterpart to the carbonic anion at the polymerization propagating species consists essentially of Mg, or Mg and $M^1$ wherein $M^1$ is at least one alkali metal selected from the group consisting of Li, Na and K, and the molar concentrations of the metals of Mg and $M^1$ satisfy the relation of $[Mg]/[M^1] \geq 4$, the invention also relates to a vinyl monomer polymerization initiator comprising $(R^2)_2Mg$ wherein $R^2$ is a hydrocarbon group.

20 Claims, 10 Drawing Sheets

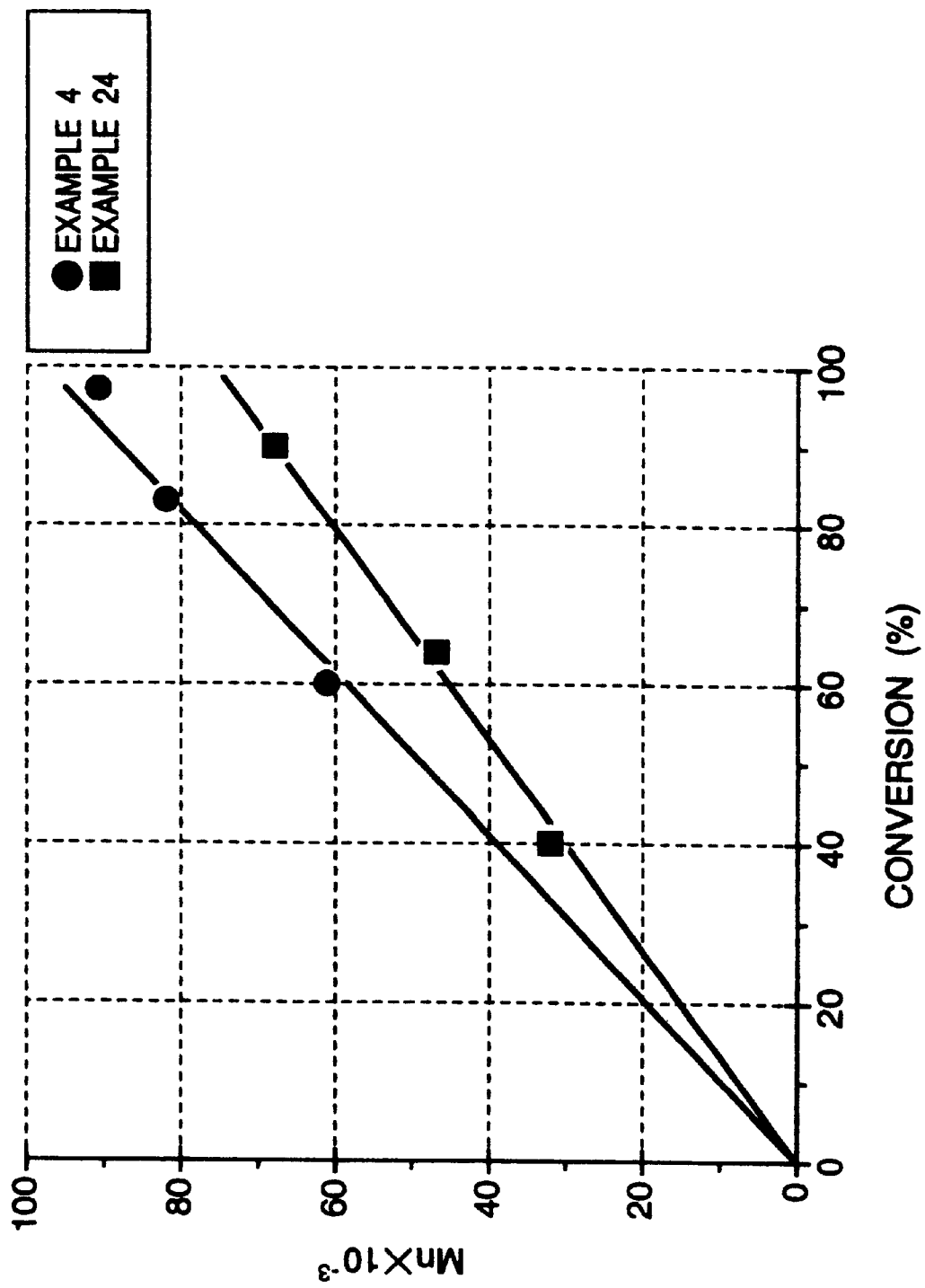

PROCESS FOR THE PREPARATION OF VINYLIC POLYMERS, POLYMERIZATION INITIATOR FOR VINYLIC MONOMERS, AND STYRENE RESIN COMPOSITION

This application is the national phase under 35 U.S.C. §371 of prior PCT International Application No. PCT/JP97/00796 which has an International filing date of Mar. 13, 1997 which designated the United States of America, the entire contents of which are hereby incorporated by reference.

TECHNICAL FIELD

The present invention relates to a vinyl polymer preparation process, vinyl monomer polymerization initiator and styrene resin compositions. According to the process of the present invention, living polymerization can be carried out in a controllable temperature range without causing self-accelerated reaction due to generation of heat in the polymerization reaction, transfer reaction and termination despite high monomer concentration and high temperature reaction conditions in comparison with the conventional anionic polymerization.

BACKGROUND ART

Styrene polymers, a typical example of which is polystyrene, have been industrially produced for a long time by means of radical polymerization. However, radical polymerization, as is well known, causes reaction termination due to recombinations of growing radicals, etc. or radical transfer reactions to the solvent or monomer, so that it was difficult to achieve structural control of the polymer, such as control of molecular weight distribution or the structures of the polymer chain ends. Also, since radical polymerization is not living polymerization, it was not possible to produce block polymers or radial polymers.

Living anionic polymerization of monomers such as styrene and butadiene has been proposed as a solution to the above problems. For instance, in anionic polymerization of styrene using butyl lithium which is a general-purpose initiator, there can be obtained a polymer with very narrow molecular weight distribution since, in this case, living polymerization free of transfer reactions and reaction termination can proceed. Also, by taking advantage of reactivity of the propagating species of the living polymer, it is possible to obtain various well-defined polymers which have been unobtainable with the conventional radical polymerization, such as styrene/butadiene block polymers. However, the living anionic polymerization of styrene, despite its potential in producing very attractive resin materials, has not been industrially utilized except for some specific cases. This is attributable, for one thing, to low production yield because living anionic polymerization is a type of solution polymerization and to high production cost as compared with conventional radical polymerization, resulting in little industrial utilization, because of the necessity of a large-scale solvent recovery process. Therefore, there has been no other way but to resort to the conventional solution polymerization techniques for the production of specific polymers such as styrene/butadiene block polymers.

For reducing the production cost in living anionic polymerization, it is necessary to decrease the amount of the solvent used for the polymerization, to enhance productivity and to minimize the load for solvent recovery. However, reduction of the amount of the solvent invites a sharp rise of viscosity of the polymerization solution, necessitating elevation of the polymerization temperature to a remarkably higher level than required in conventional solution polymerization.

When styrene is polymerized by using, for example, butyl lithium under these conditions according to the conventional art, there arise the following problems, which make such polymerization impractical.

① Since the polymerization initiation reaction and propagation reaction take place very rapidly, polymerization reaction heat is generated quickly, often resulting in unsatisfactory release of heat from the polymerization system to cause a steep rise of temperature in the system, which tends to initiate a self-acclerated reaction, the so-called "runaway" reaction (a situation where control of the reaction rate is impossible).

② At a high temperature such as 100° C. or more, carbonic anions at the propagating species of the polymer become unstable to cause frequent occurrence of transfer reactions to the solvent or polymer backbone or reaction termination due to the β-elimination, resulting in a remarkable reduction of activity of the living polymer.

In the conventional polymerization using an organic alkali metal such as butyl lithium as initiator, the above problem ① can be solved by controlling the polymerization rate by decreasing the amount of the initiator, but this gives rise to the problem that a polymer having a high molecular weight is only obtained. The number-average molecular weight Mn of a polymer obtained by anionic polymerization using an organic alkali metal depends upon the ratio of the monomer to the alkali metal according to the following equation:

$$Mn = [\text{monomer}]/[\text{organic alkali metal}] \times (\text{molecular weight of monomer})$$

([ ] : molar concentration)

Therefore, when the amount of the initiator is small, the produced polymer is correspondingly high in molecular weight, which means that a large amount of initiator is necessary for obtaining a polymer of low molecular weight. It has thus been difficult with the prior art to freely obtain a polymer of a desired molecular weight because of the operational restrictions required for preventing the runaway reaction.

It is also notable that when a conventional organic alkali metal is used, the initiation reaction proceeds very rapidly as against the propagation reaction, so that in many cases the produced polymer has a very narrow molecular weight distribution. However, the narrow molecular weight distribution is sometimes detrimental to the balance of moldability and physical properties of the resin material. Therefore, in order to have a broad molecular weight distribution, it has been essential to add an initiator gradually or to carry out polymerization in a continuous reactor having a specific retention time profile. Thus, discovery of a living anionic polymerization system capable of freely controlling the molecular weight distribution without a complicated polymerization reaction has been desired.

DISCLOSURE OF THE INVENTION

An object of the present invention is to provide a novel process for producing vinyl polymers with a controlled molecular weight distribution, according to which anionic polymerization of vinyl monomers is carried out under the high monomer concentration and high temperature conditions to allow the polymerization reaction to proceed at a controllable rate without causing a runaway reaction due to self-induced reaction heat, making it possible to conduct living polymerization free of transfer reactions and reaction termination even when conducted at a high temperature, which has never been achievable with the prior art. Another object of the present invention is to provide a styrene resin composition having excellent moldability and minimized in production of styrene monomers due to thermal decomposition.

In the course of studies aimed at these objects, the present inventor found that when anionic polymerization of a vinyl monomer such as styrene or butadiene is carried out using an initiator comprising an organic magnesium compound and a specific alkyl metal compound, quite surprisingly living polymerization proceeds at a reaction rate which enables control of heat release without causing a runaway reaction or extremely slow polymerization rate even under the conditions of high monomer concentration and high temperature. As a result, control of the molecular weight distribution is made possible. It was further found that the thus obtained styrene resin composition is lower in decomposition rate under heat retention and less in monomer formation than the resin compositions obtained by using the conventional anionic polymerization initiators. The present invention has been attained on the basis of these findings.

The present invention relates to a vinyl polymer preparation process which comprises carrying out anionic polymerization under the condition in which the polymerization temperature is not lower than 45° C. and not higher than 250° C. and the concentration of the vinyl monomer based on the polymerization solvent is 45–100% by weight, in which anionic polymerization the metal of the cation forming a counterpart to the carbonic anion at the polymerization propagating species comprises Mg, or Mg and $M^1$ (wherein $M^1$ is at least one alkali metal selected from the group consisting of Li, Na and K, and the molar concentrations of Mg and $M^1$ satisfy the relation of $[Mg]/[M^1] \geq 4$).

The present invention also relates to the vinyl polymer preparation process wherein $(R^2)_2Mg$ ($R^2$: hydrocarbon group) is used singly as the polymerization initiator.

The present invention also relates to the vinyl polymer preparation process wherein organic compounds represented by $(R^2)_2Mg$ and $R^1M^1$ and/or $R^1OM^1$ ($R^1$ and $R^2$: a hydrocarbon group; O: an oxygen atom; $M^1$: at least one alkali metal selected from the group consisting of Li, Na and K) are used as polymerization initiator, and the molar concentrations of Mg and $M^1$ satisfy the relation of $[Mg]/[M^1] \geq 4$.

The present invention further relates to the vinyl polymer preparation process wherein the above molar concentrations satisfy the relation of $[Mg]/[M^1]=10–100$.

The present invention also relates to the vinyl polymer preparation process wherein compounds represented by $(R^2)_2Mg$ and $R^1M^1$ and $R^3OH$ and/or $(R^3)_2NH$ ($R^1$, $R^2$ and $R^3$: a hydrocarbon group; O: an oxygen atom; N: a nitrogen atom; $M^1$: at least one alkali metal selected from the group consisting of Li, Na and K) are used by mixing them so as to satisfy the relations of $[Mg]>[M^1]$ and $2\times[Mg]+[M^1]>[R^3OH]+[(R^3)_2NH]$.

The present invention also relates to the vinyl polymer preparation process wherein the polymerization temperature is not lower than 45° C. and not higher than 200° C. in the region of conversion of the vinyl monomer of 0–70%.

The present invention further relates to the vinyl polymer preparation process wherein in organic metal compounds represented by $(R^2)_2Mg$ and $R^1M^1$, at least one of the carbons attached to the metals of the hydrocarbon groups $R^1$ and $R^2$ is secondary carbon and/or tertiary carbon, and the total amount $[R^{1,2}]$ of $R^1$ and $R^2$ of the secondary carbon and/or tertiary carbon satisfies the relation of $[R^{1,2}] \geq [Mg]$.

The present invention also relates to the vinyl polymer preparation process wherein in organic metal compounds represented by $(R^2)_2Mg$ and $R^1M^1$, at least one of the hydrocarbon groups of $R^1$ and $R^2$ is a polymer carbonic anion.

The present invention further relates to the vinyl polymer preparation process wherein compounds represented by $(R^2)_2Mg$ and $R^3OH$ and/or $(R^3)_2NH$ ($R^2$ and $R^3$: a hydrocarbon group; O: an oxygen atom; N: a nitrogen atom) are used by mixing them so as to satisfy the relation of $2\times[Mg]>[R^3OH]+[(R^3)_2NH]$.

The present invention also relates to the vinyl polymer preparation process wherein the poly-merization solvent is a hydrocarbon compound; the vinyl polymer preparation process wherein the concentration of the vinyl monomer based on the polymerization solvent is substantially 100% by weight; and the vinyl polymer preparation process wherein the polymerization reaction is carried out in an extruder.

The present invention further relates to a vinyl monomer polymerization initiator containing $(R^2)_2Mg$ ($R^2$: a hydrocarbon group).

The present invention also relates to a vinyl monomer polymerization initiator containing organic metal compounds represented by $(R^2)_2Mg$ and $R^1M^1$ and/or $R^1OM^1$ ($R^1$ and $R^2$: a hydrocarbon group; O: an oxygen atom; $M^1$: at least one alkali metal selected from the group consisting of Li, Na and K), wherein the molar concentrations of the metals satisfies the relation of $[Mg]/[M^1] \geq 4$.

The present invention also relates to a vinyl monomer polymerization initiator containing organic metal compounds represented by $(R^2)_2Mg$ and $R^1M^1$ and/or $R^1OM^1$ ($R^1$ and $R^2$: a hydrocarbon group; O: an oxygen atom; $M^1$: at least one alkali metal selected from the group consisting of Li, Na and K), wherein the molar concentrations of the metals satisfies the relation of $[Mg]/[M^1]=10–100$.

The present invention also relates to a vinyl monomer polymerization initiator containing compounds represented by $(R^2)_2Mg$ and $R^1M^1$ and $R^3OH$ and/or $(R^3)_2NH$ ($R^1$, $R^2$ and $R^3$: a hydrocarbon group; O: an oxygen atom; N: a nitrogen atom; $M^1$: at least one alkali metal selected from the group consisting of Li, Na and K), wherein the compounds satisfy the relations of $[Mg]>[M^1]$ and $2\times[Mg]+[M^1]>[R^3OH]+[(R^3)_2NH]$.

The present invention further relates to a vinyl monomer polymerization initiator containing compounds represented by $(R^2)_2Mg$ and $R^3OH$ and/or $(R^3)_2NH$ ($R^2$ and $R^3$: a hydrocarbon group; O: an oxygen atom; N: a nitrogen atom), wherein the compounds satisfy the relation of $2\times[Mg]>[R^3OH]+[(R^3)_2NH]$.

The present invention also relates to a vinyl polymer obtainable by the above-described preparation process.

The present invention further relates to the styrene resin compositions obtainable by anionic polymerization of styrene monomers, wherein their molecular weight distribution Mw/Mn is 2.0–10.0 and the content of trimers derived from the styrene monomers is 250 ppm or less.

The present invention further relates to a molded product obtainable by injection molding or extrusion molding of the above styrene resin compositions.

BRIEF DESCRIPTION OF THE DRAWINGS

FIGS. 1, 4 and 10 are graphs showing the relation between conversion (Conv.) and number-average molecular weight (Mn) of the polymers obtained in the Examples and Comparative Examples.

BEST MODE FOR CARRYING OUT THE INVENTION

Figure 1:
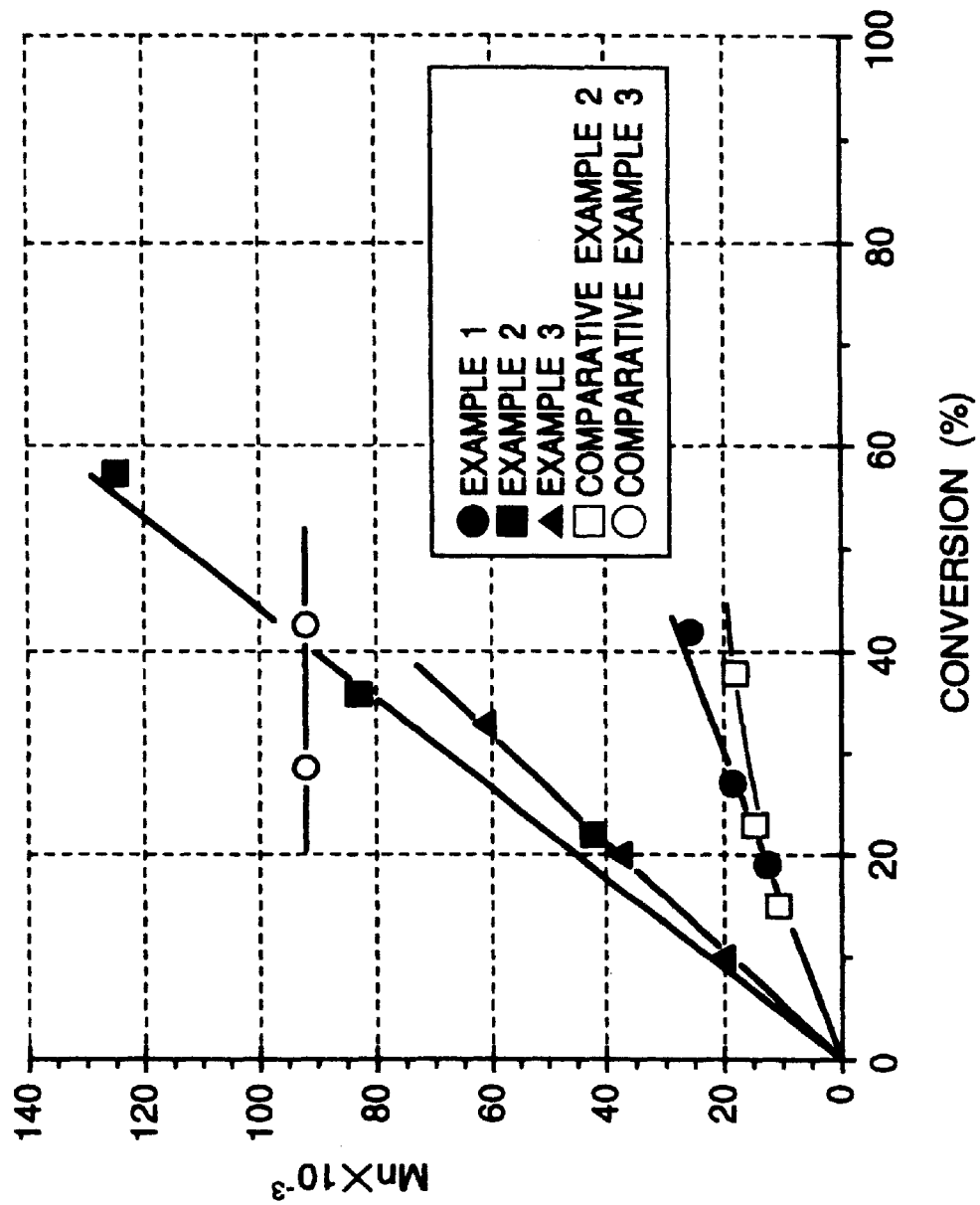
Figure 2:
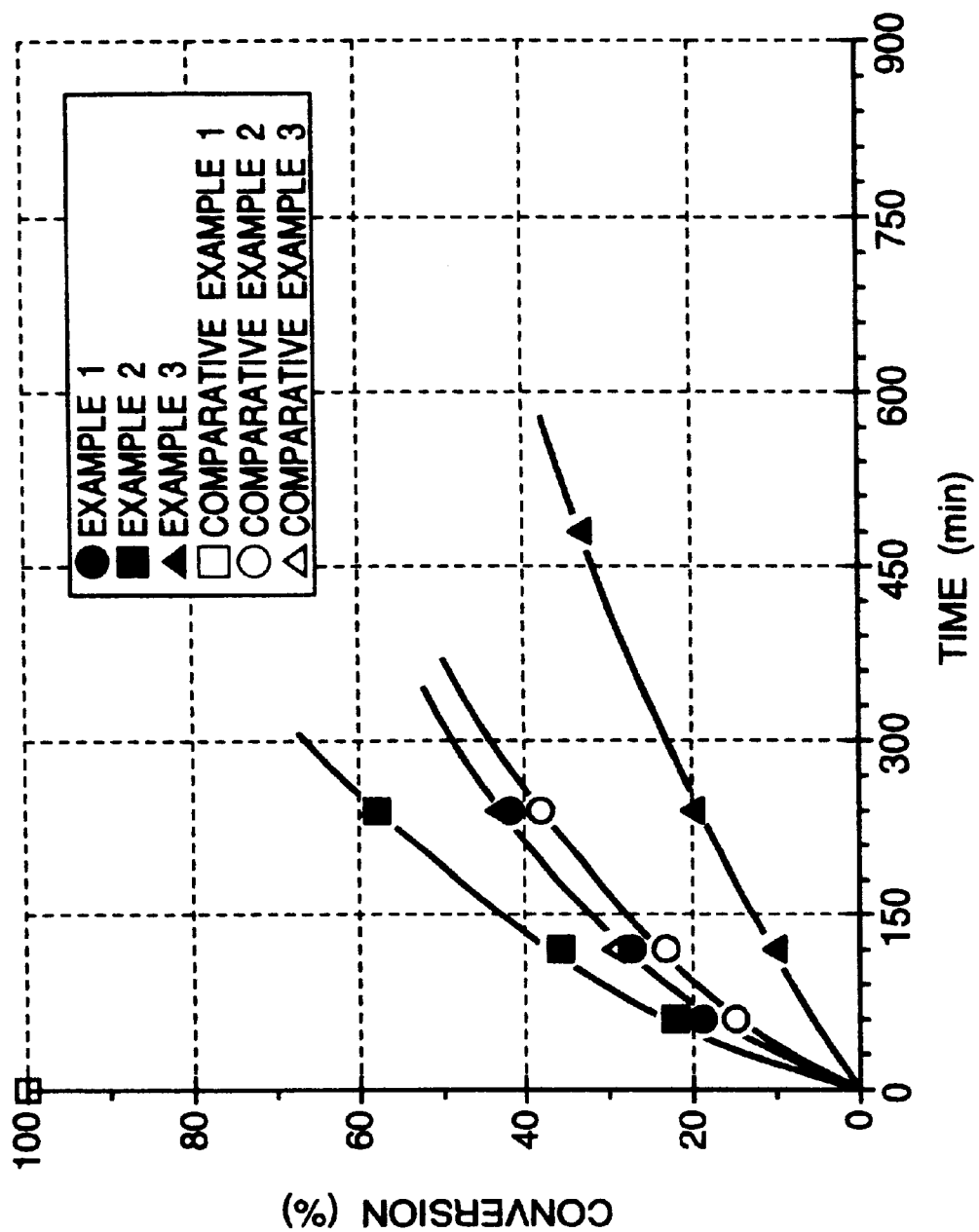
FIGS. 2, 3 and 9 are graphs showing the relation between polymerization time (Time) and conversion of the polymers obtained in the Examples and Comparative Examples.

The "vinyl monomers" used in the present invention include styrene monomers and conjugated diene monomers.

The styrene monomers include styrene, α-alkyl-substituted styrene, nuclear alkyl-substituted styrene and the like. More specifically, they include α-methyl-styrene, α-methyl-p-methylstyrene, p-methylstyrene, m-methylstyrene, o-methylstyrene, p-ethylstyrene, 2,4-dimethylstyrene, 2,5-dimethylstyrene, p-isopropyl-styrene, 2,4,6-trimethylstyrene, etc.

The conjugated diene monomers include 1,3-butadiene, isoprene, 2,3-dimethylbutadiene, 2-ethyl-1,3-butadiene, 1,3-pentadiene, etc.

These vinyl monomers may be used either singly or in combinations of two or more of them for the purpose of obtaining a copolymer.

The polymerization temperature is not lower than 45° C. and not higher than 250° C., preferably not lower than 50° C. and not higher than 240° C., more preferably not lower than 60° C. and not higher than 230° C. The lower limit of the polymerization tempera-ture should be a temperature which is at least capable of maintaining the polymerization rate at which the polymerization can be completed within the prescribed period of time. The polymerization can proceed at a low temperature below 45° C., but in the polymerization solution according to the present invention, the polymerization rate is very slow at such a low temperature, so that use of a temperature below 45° C. is disadvantageous from the viewpoint of industrial production of the polymers. When the polymerization temperature is 250° C. or higher, side reactions such as transfer reactions and reaction termination may take place frequently, making it difficult to obtain a polymer of a high molecular weight while causing coloration of the produced polymer.

In the present invention, the polymerization temperature need not be kept constant throughout the reaction; it may be raised at any desired rate in accordance with the progress of the polymerization reaction. In view of the fact that the reaction rate is high and the volume of heat generated is large in the initial stage of the polymerization reaction when the monomer concentration is high, it is recommended to initiate the polymer-ization reaction at a low temperature and gradually raise the temperature as the monomer concentration lowers with the progress of the reaction. Polymerization is preferably carried out in the temperature range of 45–200° C. when the conversion of the vinyl monomer is in the range of 0–70%, and a polymerization temperature in the range of not lower than 200° C. and not higher than 250° C. is preferred when the conversion is in the range of 70% or higher. In case the viscosity of the polymerization reaction solution is low and there is no need of raising the polymerization temperature more than necessary, polymerization may be conducted at a temperature of 200° C. or lower in the 70–100% conversion region.

The concentration of the vinyl monomer based on the polymerization solvent is not lower than 45% by weight and not higher than 100% by weight, preferably not lower than 50% by weight and not higher than 100% by weight. The higher the monomer concentration, the more desirable for the recovery of solvent, but there are the cases, depending on the type of the polymer produced, where a solvent is required to some extent from the relation between temperature and viscosity of the polymerization solution. However, since an extremely low monomer concentration is responsible not only for slow polymerization rate but also for occur-rence of a transfer reaction under a high temperature condition, it is essential that the monomer concentra-tion be at least 45% by weight in view of living polymerization efficiency.

That the concentration of the vinyl monomer based on the polymerization solvent is substantially 100% by weight means that there exists no solvent to be used other than the one derived from the initiator solution. Polymerization with 100% monomer concentration, where no polymerization solvent is used, is the most ideal form of polymerization for the industrial practice since no transfer reaction of monomer to solvent nor any reaction termination takes place. This assures high use efficiency of the initiator as well as high productivity. Also, a process for solvent recovery after termination of the polymerization is unnecessary.

The "polymerization solvent" referred to in the present invention means a solvent which takes no part in the polymerization reaction and has compatibility with the polymers. Any type of solvent generally employed for living anionic polymerization can be used, but the aromatic or alicyclic hydrocarbon compounds which are suppressive against transfer reaction and reaction termination are preferably used as polymerization solvent. Typical examples of such solvents include ethylbenzene, toluene, isopropylbenzene, benzene, cyclohexane and the like. If necessary, small quantities of other substances, for example, an ether compound such as tetrahydrofuran, dioxane, trioxane, etc., a tertiary amine such as tetramethylethylenediamine, a nitrogen compound such as pyridine, an aliphatic saturated hydrocarbon compound such as pentane, n-hexane, heptane, octane, nonane, decane, etc., and a weak Lewis acid such as triethylaluminum, diethyl zinc, etc., may be contained in the solvent within limits which do not jeopardize the effect of the present invention.

The "organic magnesium compounds represented by $(R^2)_2Mg$" used in the present invention are the compounds in which a hydrocarbon group is attached to Mg. The hydrocarbon group is preferably a (linear or branched) alkyl group represented by $CH_3(CH_2)n-$ such as methyl, ethyl, propyl, isopropyl, n-butyl, t-butyl, sec-butyl, amyl and hexyl. Preferred examples of the magnesium compounds include di-n-butylmagnesium, di-t-butylmagnesium, di-secbutylmagnesium, n-butyl-sec-butylmagnesium, n-butylethylmagnesium and n-amylmagnesium. These compounds may be used either singly or in combination.

It has been known that no polymerization of a vinyl monomer is initiated when $R^2Mg$ (R: alkyl) is used singly, and that no polymerization is initiated unless a polar compound such as hexamethylformamide (HMPA) is added. The present inventor found, however, that even if an $R^2Mg$ compound is used singly, with no polar compound added, and even in a non-polar hydrocarbon solvent, the polymerization of a vinyl monomer is initiated under a specific temperature condition, and the manner of the polymerization is living polymerization.

The lower limit of polymerization temperature when using $R^2Mg$ singly as the initiator is 100° C. or higher, preferably 110° C. or higher, more preferably 120° C. or higher. At 100° C. or lower, polymerization proceeds very slowly or is not initiated.

For conducting the polymerization initiating reaction or propagation reaction more efficiently than in polymerization using $R^2Mg$ alone as initiator, it is recommended to add to $R^2Mg$ an organic metal compound(s) represented by $R^1M^1$ and/or $R^1OM^1$ ($R^1$, $R^2$: a hydrocarbon group; O: an oxygen atom; $M^1$: at least one alkali metal selected from the group consisting of Li, Na and K).

Some initiators comprising a combination of $R^2Mg$ and $R^1M^1$ and/or $R^1OM^1$ have been known, but they were impractical because of the problems such as mentioned below.

Macromolecules, Vol. 19, p. 299 (1986) and U.S. Pat. No. 3,716,495 show the examples of styrene polymerization, butadiene polymerization, and styrene and butadiene copolymerization at 50° C. or 70° C. using a polymerization initiator consisting of dibutyl magnesium and butyl lithium, or diamyl magnesium and butyl lithium as in the present invention. In these cases of polymerization, however, the concentration of the monomer based on the polymerization solvent cyclohexane is as low as about 11%, and further the metal concentration ratio is in the region of [Mg]<[Li]. To the knowledge of the present inventor, in the region of [Mg]<[Li], the metal at the polymerization propagating species does not have Mg, and it is impossible to control the polymerization rate, molecular weight of the polymer and molecular weight distribution independently of each other. Also, when the initiators cited in the above references are used, although it is possible to carry out living polymerization without causing a runaway reaction at 50° C. or 70° C. with a low monomer concentration such as 11%, a runaway reaction does take place with the monomer concentrations and temperature ranges specified in the present invention, thus making it unable to control the polymerization rate.

U.S. Pat. No. 4,225,690 discloses a polymerization initiator comprising dibutyl magnesium and amyl potassium or amyl oxypotassium. However, in this polymer initiator, too, the metal concentrations are in the region of [Mg]<[K], the monomer concentration is as low as about 10–25%, the polymerization propagating species does not have Mg, and it is impossible to independently control the polymerization rate, molecular weight of the polymer produced and its molecular weight distribution. Also, a runaway reaction occurs with the concentration and temperature ranges specified in the present invention, making it impossible to control the polymerization rate.

EP-A-234,512 discloses a process for producing styrene/butadiene block copolymers. Example 34 thereof describes a procedure where styrene is polymerized at 65° C. using a polymerization initiator composed of dibutyl magnesium and butyl lithium at a concentration ratio ([Mg]/[Li]) of 2.5, and then butadiene is blocked with styrene. In this case, however, the monomer concentration based on the polymerization solvent (cyclohexane) is as low as 20%, and although no runaway reaction occurs, the activity of the living polymer lowers, so that unreacted polystyrene remains in the ensuing step of block polymerization of butadiene. In addition, the molecular weight Mn of the obtained copolymer is as low as 8,900.

The present inventor found that if the polymerization initiator composed of $R^2Mg$ and $R^1M^1$ and/or $R^1OM^1$ satisfies the particular relation of $[Mg]/[M^1] \geq 4$ ([ ]: molar concentration) for the molar concentration ratio of metals, living polymerization proceeds without causing a runaway reaction even under the high temperature and high monomer concentration conditions. Thus, it is possible to the control molecular weight, polymerization rate and molecular weight distribution independently of each other.

It has never been possible with the conventional anionic polymerization techniques to control molecular weight, polymerization rate and molecular weight distribution independently of each other in one pot of polymerization, so that this finding is quite surprising and the present invention could have never been predicted from the prior art.

Such effect of the present invention is speculated to be attributable to the following mechanism.

It is considered that in the present invention, the carbonic anions which become unstable under high temperatures in polymerization with a conventional general-purpose initiator such as butyl lithium are capped with a metal forming a stable bond as shown in the following formula (1), and further a compound which can interact structurally with the compound of the formula (1) weakens the bonding force of the carbonic anions and their counter cations to thereby activate the carbonic anions (see the formula (2)). Further, under the polymerization temperature, the structure of the formula (1) is brought into a dormant state while the structure of the formula (2) becomes active, thus producing an equilibrium state between the structure of the formula (1) and that of the formula (2).

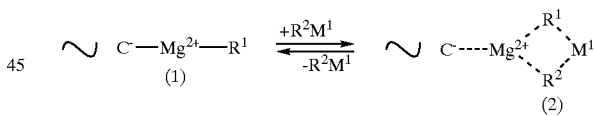

It is speculated that in a polymerization system having such a reaction mechanism, it will become easier to establish a living polymerization system if the equilibrium is biased to the left side (growing the dormant state) with rise of temperature to accordingly expand the stable state. It is also speculated that the molecular weight of the polymer is governed by the amount of Mg since Mg always exists at the propagating species of polymerization, the polymerization rate is governed by the $[Mg]/[M^1]$ ratio since $M^1$ is activated to permit the polymerization to advance, and the molecular weight distribu-tion is also governed by the $[Mg]/[M^1]$ ratio because of the bias of equilibrium and exchange rate to the other dormant terminals of $RM^1$.

As the activator of the polymerization initiator in the present invention (when the term "polymerization initiator" is used in this specification, it may include its activator), the organic metal compounds represented by $R^1M^1$ and/or $R^1OM^1$ ($R^1$ and $R^2$: a hydrocarbon group; O: an oxygen atom; $M^1$ is at least one alkali metal selected from the group consisting of Li, Na, and K) are preferably used. Specifically, $R^1$ in the formula $R^1M^1$ represents a hydrocarbon group, preferably a linear or branched alkyl group represented by $CH_3(CH_2)n-$ such as methyl, ethyl, propyl, isopropyl, n-butyl, t-butyl, sec-butyl, amyl or hexyl. Typical examples of $R^1M^1$ include methyl lithium, n-butyl lithium, sec-butyl lithium, t-butyl lithium, n-propyl lithium, isopropyl lithium, benzyl lithium, phenyl lithium, hexyl lithium, butyl sodium, and cumyl potassium. These compounds may be used either singly or in combination.

$R^1$ in the formula $R^1OM^1$ represents a hydrocarbon group, preferably a linear or branched alkyl group represented by $CH_3(CH_2)n-$ such as methyl, ethyl, propyl, isopropyl, n-butyl, t-butyl, sec-butyl, amyl or hexyl, a phenyl group or an alkyl-substituted phenyl group. Examples of $R^1OM^1$ include methoxylithium, methoxysodium, methoxypotassium, ethoxylithium, ethoxysodium, ethoxypotassium, propoxylithium, propoxysodium, propoxypotassium, isopropoxylithium, isopropoxysodium, isopropoxypotassium, n-butoxylithium, n-butoxysodium, n-butoxypotassium, sec-butoxylithium, sec-butoxysodium, sec-butoxypotassium, tert-butoxy-lithium, tert-butoxysodium, tert-butoxypotassium, amyloxylithium, amyloxysodium, amyloxypotassium, tert-amyloxylithium, tert-amyloxysodium, tert-amyloxy-potassium, hexyloxylithium, hexyloxysodium, hexyloxy-potassium, phenoxylithium, phenoxysodium, phenoxy-potassium, 2,4-di-tert-butylphenoxylithium, 2,4-di-tert-butylphenoxysodium, 2,4-di-tert-butylphenoxy-potassium, 2,6-di-tert-butylphenoxylithium, 2,6-di-tert-butyl-phenoxysodium, 2,6-di-tert-butylphenoxypotassium, 3,5-di-tert-butylphenoxylithium, 3,5-di-tert-butyl-phenoxysodium, 3,5-di-tert-butylphenoxypotassium, 2,6-di-tert-butyl-4-methylphenoxylithium, 2,6-di-tert-butyl-4-methylphenoxysodium, and 2,6-di-tert-butyl-4-methylphenoxypotassium. These compounds may be used either singly or in a combination of two or more of them.

$R^1M^1$ and $R^1OM^1$ may be used either singly or in combination.

$R^1M^1$ and/or $R^1OM^1$ are used so that the Mg to $M^1$ molar concentration ratio will satisfy the relation of $[Mg]/[M^1] \geq 4$ ([ ]: molar concentration), preferably $[Mg]/[M^1] \geq 4.5$, more preferably $[Mg]/[M^1] \geq 5$. When $[Mg]/[M^1]$ is less than 1, part of the cationic metal forming a counterpart to the carbonic anion at the polymerization propagating species of the living polymer produced during polymerization is constituted by the $M^1$ metal alone, and it is not possible to control the reactivity due to the presence of Mg. Consequently, a runaway reaction may take place with the polymerization temperature and monomer concentration ranges specified in the present invention, and no stable living polymerization system can be formed. In the region of $1 \leq [Mg]/[M^1] < 4$, living polymerization proceeds without causing a runaway reaction under a condition close to the lower limit of the polymerization concentration and temperature ranges in the present invention. In case polymerization is carried out under a condition of extremely high concentration, where almost no polymerization solvent is used, and at a high temperature of 100° C. or more, a runaway reaction is induced and the living polymer activity is lowered. Further, in this case, there can be obtained only those polymers whose molecular weight distribution is substantially narrow. As for the molding resin material, it is desirable for certain uses of the product to use a polymer in which the low-molecular weight component and the high-molecular weight component are mixed with each other in a certain ratio, that is, a polymer whose molecular weight distribution is broad rather than narrow, from the standpoint of offering a good balance of fluidity and mechanical properties at the time of molding.

The present inventor found that when a vinyl monomer is polymerized by varying the $[Mg]/[M^1]$ ratio under conditions for completing polymerization in a certain prescribed period of time, quite surprisingly the molecular weight distribution widens sharply in the region of $[mg]/[M^1] > 4$. This is probably because the viscosity of the reaction system rises up with progress of polymerization in the high monomer concentration range, causing an apparent drop of exchange reaction rate of the activator for the polymerization initiator.

For reducing the viscosity of the high concentration solution in the reaction system, it is recommended to carry out polymerization at a high temperature of 100° C. or more, and to set the Mg and $M^1$ molar concentration rate at $[Mg]/[M^1] > 10$ for allowing progress of living polymerization without causing a runaway reaction in such a situation. The present inventor also found that the molecular weight distribution widens consistently as the $[Mg]/[M^1]$ ratio increases. However, excessive increase of the $[Mg]/[M^1]$ ratio is undesirable as it causes too much widening of the molecular weight distribution and also increases the amount of the low molecular weight components, for example, oligomer moieties including dimers and trimers. The most preferred range of molar concentration ratio is $10 \leq [Mg]/[M^1]100$.

The present inventor further found that when a compound or compounds represented by $R^3OH$ and/or $(R^3)_2NH$ ($R^3$: a hydrocarbon group; O: an oxygen atom; N: a nitrogen atom), which normally can serve as an anionic polymerization terminator, is added to an initiator consisting of $(R^2)_2Mg$ and $R^1M^1$ ($[Mg]>[M^1]$) at a specific ratio, quite surprisingly polymerization of vinyl monomers is initiated and further living polymerization proceeds under the high-temperature and high-concentration conditions.

$R^3OH$ and $(R^3)_2NH$ used in the present invention are the hydrocarbon groups, which are preferably linear or branched alkyl groups represented by $CH_3(CH_2)n-$, such as methyl, ethyl, propyl, isopropyl, n-butyl, t-butyl, sec-butyl, amyl and hexyl, phenyl groups, alkyl-substituted phenyl groups, hydrocarbon-based ether compound groups represented by $CH_3(OCH_2CH_2)n-$, and the groups represented by $(CH_3)_2N(CH_2CH_2)n-$. Typical examples of $R^3OH$ are methanol, ethanol, propanol, isopropanol, n-butyl alcohol, sec-butyl alcohol, tert-butyl alcohol, amyl alcohol, hexyl alcohol, phenol, 2,4-di-tert-butylphenol, 2,6-di-tert-butylphenol, 3,5-di-tert-butylphenol, 2,6-di-tert-butyl-4-methylphenol, 2-methoxyethanol, and 2-(2-di-tert-methoxyethoxy)ethanol. Examples of $(R^3)_2NH$ are N,N-dimethylethanolamine, dimethylamine, N-ethylmethylamine, diethylamine, dipropylamine, dibutylamine, dihexylamine, dioctylamine, didecylamine, N,N,N'-trimethylethylenediamine, N,N,N',N'-tetramethyldiethylenetriamine and the like. These compounds may be used either singly or in combinations of two or more.

$R^3OH$ and $(R^3)_2NH$ added must be in an amount that satisfies the relation of $2 \times [Mg]+[M^1] > [R^3OH]+[(R^3)_2NH]$. Otherwise, if $2 \times [Mg]+[M^1] < [R^3OH]+[(R^3)_2NH]$, polymerization will not be initiated.

As a result of further research on the organic metal compounds composed of $(R^2)_2Mg$ and $R^1M^1$, the present inventor found that at least one of the carbons attached to the metal of the hydrocarbon group of $R^1$ and $R^2$ is a secondary carbon and/or tertiary carbon, and when an organic metal compound satisfying the relation of $[R^{1,2}] \geq [Mg]$ ($[R^{1,2}]$: the total amount of $R^1$ and $R^2$ of secondary carbon and/or tertiary carbon) is used for polymerization of a vinyl monomer, the polymerization initiator efficiency of $(R^2)_2Mg$ is enhanced (the initiating reaction points are increased) and yet the polymerization rate is lowered. This is probably for the reason that since it is easier to initiate polymerization with $R^1$ and $R^2$ having a secondary carbon and/or tertiary carbon than with $R^1$ and $R^2$ having a primary carbon, when $[R^1, 2] \geqq [Mg]$, Mg serves as a bifunctional initiator in an amount which corresponds to $[R^{1,2}]-[Mg]$, inviting a corresponding rise of initiator efficiency. Therefore, if $R^1$ and $R^2$ having a primary carbon and secondary and/or tertiary carbon are present in a mixed state, $R^1$ and $R^2$ having a secondary carbon and/or tertiary carbon alone are necessarily attached to the initiating terminal of the polymer, and the molecular weight is determined by the ratio amount of the monomer to $R^1$ and $R^2$ of secondary carbon and/or tertiary carbon. At the polymerization propagating species, there exist mixed with each other two different structures: (A) ~polymer~—Mg—$R^2$ and (B) ~polymer~Mg—~polymer~, and it is supposed that (B) is lower in polymerization reactivity, that is, lower in polymerization rate. Therefore, it is possible to control the polymerization rate by adjusting the (A)/(B) ratio.

In the present invention, in the organic metal compounds composed of $(R^2)_2Mg$ and $R^1M^1$, at least one of the hydrocarbon compounds of $R^1$ and $R^2$ may be a polymer carbonic anion. "Polymer carbonic anion" is an anion of the living polymer obtained by living polymerization of a vinyl monomer, with its polymerization degree being not less than 1.

In the present invention, when a $(R^2)_2Mg$ compound is used, polymerization of a vinyl monomer is initiated even under a high-temperature and high-monomer-concentration condition, and living polymerization proceeds. It was further found that living polymerization is also allowed to proceed without causing a runaway reaction even under a high-temperature and high-concentration condition when a compound represented by $R^3OH$ and/or $(R^3)_2NH$ ($R^2$ and $R^3$: a hydrocarbon group; O: an oxygen atom; N: a nitrogen atom) is mixed instead of adding $R^1M^1$ and $R^1OM^1$. The effect of addition of $R^3OH$ and/or $(R^3)_2NH$ is to elevate the polymerization rate more than the addition of $(R^2)_2Mg$ alone. The polymerization rate is elevated as the amount of said compound(s) is increased. However, the amount of said compounds) to be added is limited to such a range that satisfies the relation of $2\times[Mg]>[R^3OH]+[(R^3)_2NH]$. If $2\times[Mg]+[M^1] \geqq [R^3OH]+[(R^3)_2NH]$, polymerization will not proceed.

Since the polymerization of vinyl monomer using an initiator of the present invention proceeds in the region of high monomer concentration, it is expected that the viscosity of the polymerization solution will become fairly high, so that it is desirable to use an extruder as the polymerization reactor in view of the uniformity of the polymerization reaction. "Extruder" means here a single-screw or double-screw extruder which has a screw and/or a kneading disc.

Polymerization in the extruder by use of an initiator of the present invention can dispense with the solvent recovery operation after completion of polymerization since living polymerization occurs even with a very small quantity of solvent, so that there can be realized a very economical process in which the solvent can be removed only by a deaeration treatment in the extruder.

The method for termination of polymerization is not critical in the present invention; generally known termination methods of anionic polymerization can be used. For example, polymerization can be terminated by adding water, an alcohol, a protonic acid compound such as carboxylic acids, carbon dioxide or the like to the polymerization solution.

It is known that a small quantity of monomer(s) exists in the styrene polymers obtained by radical polymerization, and if a molded product of the styrene polymer is placed in an oleophilic compound atmosphere, the monomer(s) in the molded product may bleed out to give rise to problems.

There are considered principally two patterns in which the monomers remain in the polymer: the monomers which have not been reacted during the polymerization operation being left in the polymer; or the monomers which have been produced by decomposition of polymers or oligomers during the molding operation being present in the molded product. Monomers which remain unreacted during the polymerization can be significantly reduced by a deaeration treatment under high vacuum, but the polymer and oligomer are further decomposed upon encountering thermal and shearing loads during molding so as to produce monomers. Monomers are produced in large quantities by thermal decomposition of the oligomers such as dimers and trimers, and it is difficult to remove these oligomers from the polymer by a deaeration treatment.

It is known that, with oligomers produced by heat retention of a polymer, generally, the trimer exists in greater amount than the dimer (J. Polymer Sci.: Symposium No. 57, 81–88, (1976)). In fact, the amount of trimer in a styrene polymer produced by radical polymerization is approximately ten times the amount of dimer. Therefore, it has been an important subject to control the formation of trimer in the polymer and to provide a styrene resin which is minimized in the amount of monomer produced during the molding operation.

The present inventor has pursued research on this subject and found that the amount of trimer produced during polymerization can be significantly lessened by using a specific anionic polymerization technique, and that the polymer obtained by this process is minimized in the amount of monomer formed under heat retention. This finding constitutes a basis for the present invention. Thus, the styrene polymers produced according to the process of the present invention are minimized in the amount of monomers formed under heat retention.

Also, the styrene polymers produced by the process of the present invention can function to arrest formation of monomers under heat retention even if metal residues originating in the polymerization initiator exist in small quantities in the polymer. In the conventional anionic polymerization, metal residues originating in the polymerization initiator are inevitably left in the produced polymer, and it is considered that these metal residues accelerate thermal decomposition of the polymer in molding thereof. It is generally practiced to remove these metal residues by extraction with water, but this method is incapable of perfectly removing the metal residues, and thus small quantities of metal residues are substantially left in the produced polymer. In the case of the styrene polymers of this invention, even if small quantities of Mg and $M^1$ metals are left in the polymer, there is insignificant formation of trimer. Thus, in accordance with this invention, a very economical industrial process requiring no step for extraction removal of metal residues can be employed for the production of polymers obtainable with a small amount of initiator or for polymerization using a chain transfer agent.

The molecular weight of styrene resin obtained according to the process of the present invention is in the range of $10^3$ to $10^7$, and the amount of Mg used in this process is about 3 to 2,400 ppm, but the most favorable effect is obtained in the molecular weight range where the Mg content is not greater than 100 ppm.

"Mg" and "$M^1$" which may be left in the styrene polymers of the present invention mean the Mg and $M^1$ compounds which are produced after deactivation of the compounds used as polymerization initiator. The Mg to $M^1$ molar ratio ([Mg]/[$M^1$]) is preferably 4–10, more preferably 5–90, even more preferably 6–80.

Further research by the present inventor has led to the discovery of a styrene resin composition having excellent heat decomposability, moldability and, in particular, foaming characteristics. This styrene resin composition can be obtained from anionic polymerization and its molecular weight distribution Mw/Mn is from 2.0 to 10.0 and the content of the styrene-derived trimer is not greater than 250 ppm.

A method for inhibiting formation of styrene from polystyrene by thermal load in a molder or extruder is disclosed in JP-A-7-292188. This method, however, is still unsatisfactory in its effect of inhibiting formation of styrene by thermal load since polystyrene obtained from radical polymerization is used as polymer. Use of polystyrene obtained by anionic polymerization can afford a certain improvement of the styrene formation inhibitory effect, but this patent document sheds no light on the amount of trimer present in the produced polymer and the effect of the foaming characteristics.

The present inventor discovered a styrene resin composition whose foaming characteristics are improved in a specific region of molecular weight distribution and which is very stable thermally and minimized in formation of monomers by decomposition, and this discovery is embodied in the present invention.

The term "styrene resin" used in the present invention refers to styrene polymers that can be obtained by anionic polymerization and whose molecular weight distribution Mw/Mn (weight-average molecular weight/number-average molecular weight) is from 2.0 to 10.0, preferably from 2.1 to 9.5, more preferably from 2.2 to 9.0. When Mw/Mn is less than 2.0, the foaming characteristics are deteriorated while when it exceeds 10.0, the low-molecular weight component increases, resulting in increased formation of styrene monomers by decomposition of the polymer in the course of secondary working such as injection foam molding or extrusion foaming.

The term "trimer" used in the present invention refers to trimers having the molecular structure represented by the following formula (3):

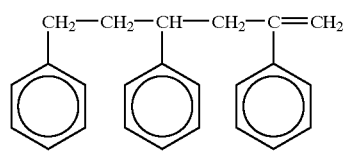

(3)

The amount of trimer existing in the styrene polymers is not greater than 250 ppm, preferably not greater than 230 ppm, more preferably not greater than 200 ppm. When the trimer content exceeds 250 ppm, the amount of the styrene monomers formed under heat retention increases, which may cause problems with the migration of such monomers to the packed fat-containing foods when the molded product of the styrene polymer is used as a food packaging material.

The styrene resin composition of the present invention is minimized in formation of styrene monomers by heat decomposition and has excellent foaming characteristics, so that it is very suitable for use as an injection or extrusion molding material.

The styrene resin composition of the present invention may contain additives such as lubricants, releasing agents, plasticizers, colorants, flame retardants, foaming agents, etc., within the limits of the conception of the present invention.

The present invention will be further illustrated by the following Examples and Comparative Examples, but it should not be construed to be restricted by these examples.

The monomers and solvents used in the present invention were purified in the following way before use. The organic metal compounds, alcohols, secondary amines and other reagents used in the Examples and Comparative Examples are explained below.

(1) Styrene (SM)

A commercial product manufactured by Asahi Chemical Industry Co., Ltd. It was distilled under reduced pressure once under $CaH_2$, subjected to a deaeration treatment and then sealed under a dry nitrogen atmosphere.

(2) Ethylbenzene (EB) and cyclohexane

Commercial products manufactured by Wako Pure Chemical Industries Co., Ltd. The special grade products were distilled under reduced pressure once under $CaH_2$, subjected to a deaeration treatment, mixed with molecular sieves and then sealed under dry nitrogen.

(3) n-Butyl lithium (nBuLi)

Product manufactured by Kanto Chemical Co., Ltd. Used as a 1.6 Mn-hexane solution.

(4) sec-Butyl lithium (sBuLi)

Product manufactured by Kanto Chemical Co., Ltd. Used as a 1.0 Mcyclohexane solution.

(5) tert-Butyl lithium (tBuLi)

Product manufactured by Kanto Chemical Co., Ltd. Used as a 1.6 Mn-heptane solution.

(6) Dibutyl magnesium ($Bu_2Mg$)

Product manufactured by Aldrich Inc. A 1.0M heptane solution of 1:1 mixture of n-dibutyl magnesium and sec-dibutyl magnesium.

(7) n-Butyl alcohol (nBuOH), sec-butyl alcohol (sBuOH), tert-butyl alcohol (tBuOH) and di-n-butylamine ($BU_2NH$)

Special grade products manufactured by Kanto Chemical Co., Ltd. Distilled under $CaH_2$, subjected to deaeration treatment, mixed with molecular sieves and sealed under dry nitrogen.

(8) tert-Butoxysodium (tBuONa) and tert-butoxypotassium (tBuOK)

Products manufactured by Aldrich Inc.

(9) Polymerization Terminator

A 90/10 (by volume) mixture of tetrahydrofuran (THF) and methanol (MeOH) was used.

The polymerization rate, molecular weight and molecular weight distribution of the obtained polymers were determined in the following ways.

(10) Polymerization Rate

Unreacted SM was measured by gas chromatography (GC) under the conditions 1, and the polymerization rate (conversion) was determined from the following equation:

Polymerization rate (%)=([supplied SM concentration]−[unreacted SM concentration])/[supplied SM concentration]×100

(11) Number-average Molecular Weight (Mn), Weight-average Molecular Weight (Mw) and Mw/Mn Determined by gel permeation chromatography (GPC).

(12) Measurement of Trimer

Conducted under the conditions 2.

[GC Determination Conditions]

Conditions 1

| | |
|---|---|
| Measuring device: | GC 14B mfd. by Shimadzu Corp. |
| Column: | PEG 20M (φ 3 mm × 3 m) |
| Carrier gas: | nitrogen, flow rate = 50 ml/min |
| Detector: | FID |
| Column temp.: | Maintained at 125° C. for 10 minutes and then further heated at a rate of 35° C./min until reaching 230° C. Injection and detector temp. = 230° C. |
| Internal standard reagent: | EB |

Conditions 2

| | |
|---|---|
| Measuring device: | GC 14B mfd. by Shimadzu Corp. |
| Column: | TC-1 (inner diameter: 0.25 mm; thickness: 0.25 μm; |
| length: | 30 m; mfd. by GL Science Inc.) |
| Carrier gas: | nitrogen, flow rate = 50 ml/min |
| Detector: | FID |
| Column temp.: | Maintained at 50° C. for 5 minutes and then further heated at a rate of 20° C./min until reaching 320° C. |
| Injection temp.: | 260° C. |
| Detector temp.: | 330° C. |
| Internal standard reagent: | anthracene |

[GPC Measuring Conditions]

| | |
|---|---|
| Measuring device: | TOSO HLC-8020 (with built-in differential refractive index detector) |
| Column: | TOSO TSKgel-GMH$_{XL}$ × 2 |
| Temperature: | 38° C. |
| Solvent: | tetrahydrofuran (THF) |
| Sample concentration: | 0.1 wt/v % |
| Sampling pitch: | once per 0.4 second |
| Determination of molecular weight: | |
| Calibration curves were drawn by plotting the relation between the molecular weight of TOSO TSK standard polystyrenes and elution time as third-order repression curve, and the molecular weight was determined from the curve. | |

In the following Examples and Comparative Examples, all the polymerization operations were carried out according to the following procedure unless otherwise noted.

[Polymerization Operation]

A glass container and a syringe, which had been heated to 140° C. and dried, a monomer, a solvent and a reagent were placed in a nitrogen globe (Model VDB-SA-Q mfd. by Eiko Shokai KK). The inside atmosphere of the nitrogen globe has been well substituted with nitrogen which had been dehydrated and dried with molecular sieves. Prescribed amounts of the monomer and solvent were put into a 50 ml pressure glass bottle, followed by further addition of a prescribed amount of a polymerization initiator. In case the concentration of the polymerization initiator was high, it was diluted with ethylbenzene and then added to the monomer solution. The polymerization solution was 10 ml in all cases. After feeding has been completed, the pressure bottle was stoppered with nitrile rubber, then taken out from the nitrogen globe and capped with a metal crown. The pressure bottle was put into an oil bath of a prescribed temperature. The time when the bottle was put into the oil bath was indicated as time 0. The pressure bottle was shaken properly to stir the reaction solution. On passage of a prescribed period of time, the pressure bottle was taken out from the oil bath and immediately put into water for cooling to room temperature. After cooling, 5 ml of the terminator was supplied into the pressure bottle so as to prevent entrance of air. Also, the pressure bottle was shaken quickly to effect uniform dispersion of the terminator. The resulting polymerization solution was diluted with THF and this diluted solution was used for GC and GPC analyses.

EXAMPLES 1–3

In the nitrogen globe, 9 ml of EB and 1 ml of Bu$_2$Mg were put into a 30 ml beaker to dilute Bu$_2$Mg. A mixed solution of SM and EB was supplied into the pressure bottle to a concentration shown in Table 1, then the diluted initiator solution was added thereto to a prescribed concentration, and the resulting polymerization solution was mixed well by shaking. Three bottles of completely the same polymerization solution were prepared. On reaching the prescribed polymerization time shown in Table 1, the terminator was added to the solution to stop polymerization. The analytical results of the obtained polymers are shown in Table 1.

Generally, in the living polymerization systems, the molecular weight Mn of the polymer increases linearly in proportion to the conversion. A graph showing the relation between conversion and Mn in Examples 1–3 embodying the polymerization system of the present invention is shown in FIG. 1. In the polymerization solutions shown in these Examples, Mn increased linearly in proportion to conversion, indicating that these polymerization solutions are those of living polymerization. Also, in Examples 1–3, polymerization proceeded at a moderate rate without causing a runaway reaction as shown in Table 2.

Comparative Example 1

The procedure of Example 1 was followed except that an nBuLi solution was used in place of Bu$_2$Mg to a concentration of 2.56 mM, and that the pressure bottle containing the polymerization initiator was placed in liquid nitrogen so as to prevent polymerization from starting. After being taken out of the nitrogen globe, it was put into an oil bath of 120° C. In a few minutes, the polymerization solution was bumped to conclude polymerization (runaway reaction occurred).

Comparative Example 2

The procedure of Example 1 was followed except that polymerization was carried out at the concentration shown in Table 2. Polymerization proceeded without causing a runaway reaction, but as seen from FIG. 1, Mn increased deviating from linearity with conversion and the living polymerization activity was decreased with increase of conversion.

Comparative Example 3

The procedure of Example 1 was followed except that polymerization was carried out at 150° C. without adding the Bu$_2$Mg initiator solution.

As seen from plotting of Mn and conversion in FIG. 1, this polymerization solution (conventional heat radical polymerization solution) was constant in molecular weight regardless of the progress of polymerization. Also, the polymers obtained only had a wide molecular weight distribution (Mw/Mn=2.2).

The polymerization conditions of Examples 1–3 are 120–150° C. and 6 hours, which are the conditions normally supposed to cause heat radical polymerization. However, no peak of the molecular weight such as shown in Comparative Example 3 was observed in GPC analysis. This indicates that no heat radical polymerization but only anionic polymerization occurred in Examples 1–3.

EXAMPLES 4–8

In the nitrogen globe, dilute solutions of Bu$_2$Mg and nBuLi were each prepared in advance at the mixing ratios shown in Table 3. A dilute initiator solution was added to a mixed solution of SM and EB to the concentrations shown in Table 3 and mixed well. The resulting solution was dispensed into pressure bottles in an amount of 10 ml per bottle and polymerized at the temperatures and for the times shown in Table 3.

Figure 3:
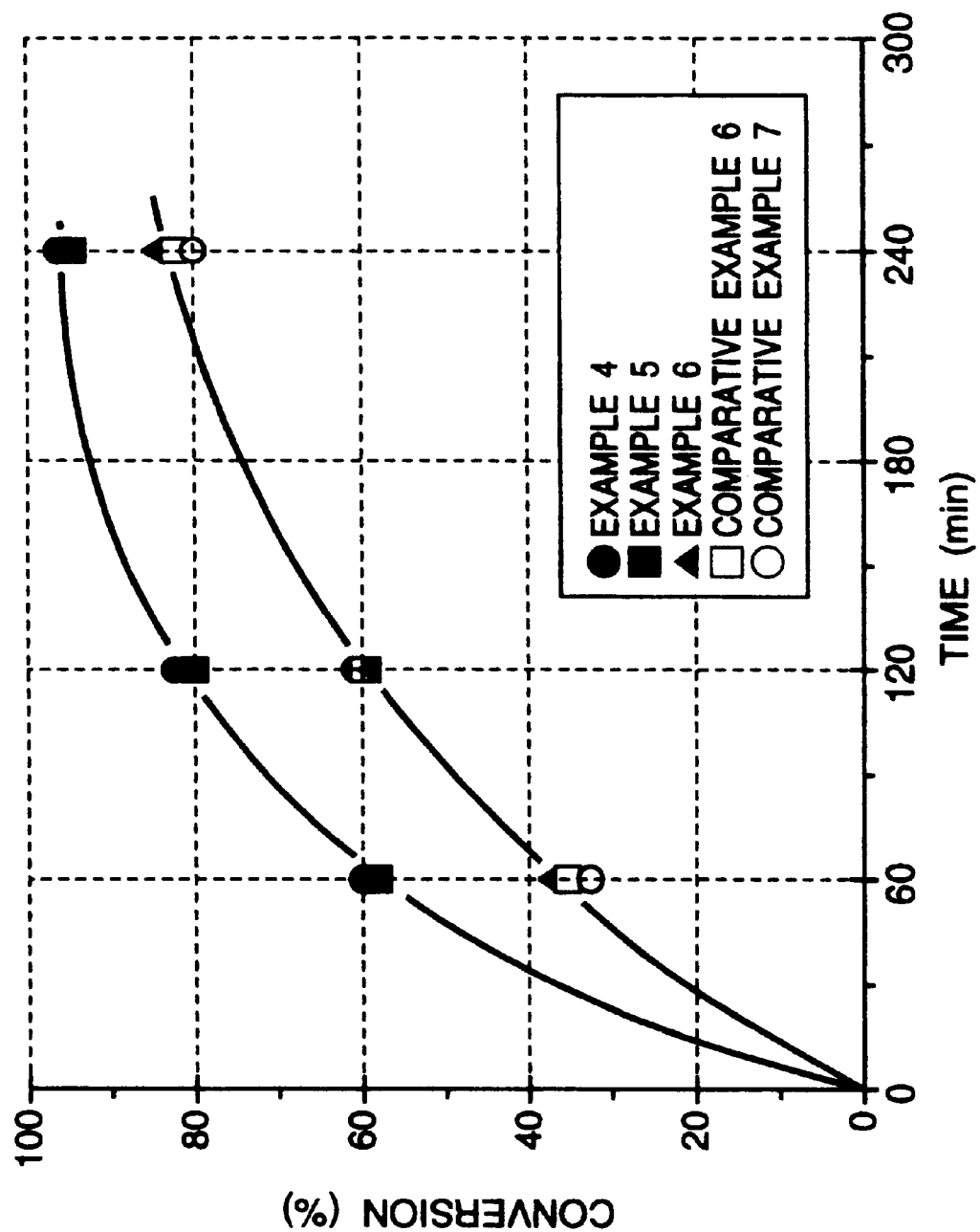

As seen from FIG. 3, polymerization proceeded without a runaway reaction despite the high-temperature and high-monomer-concentration conditions.

Figure 4:
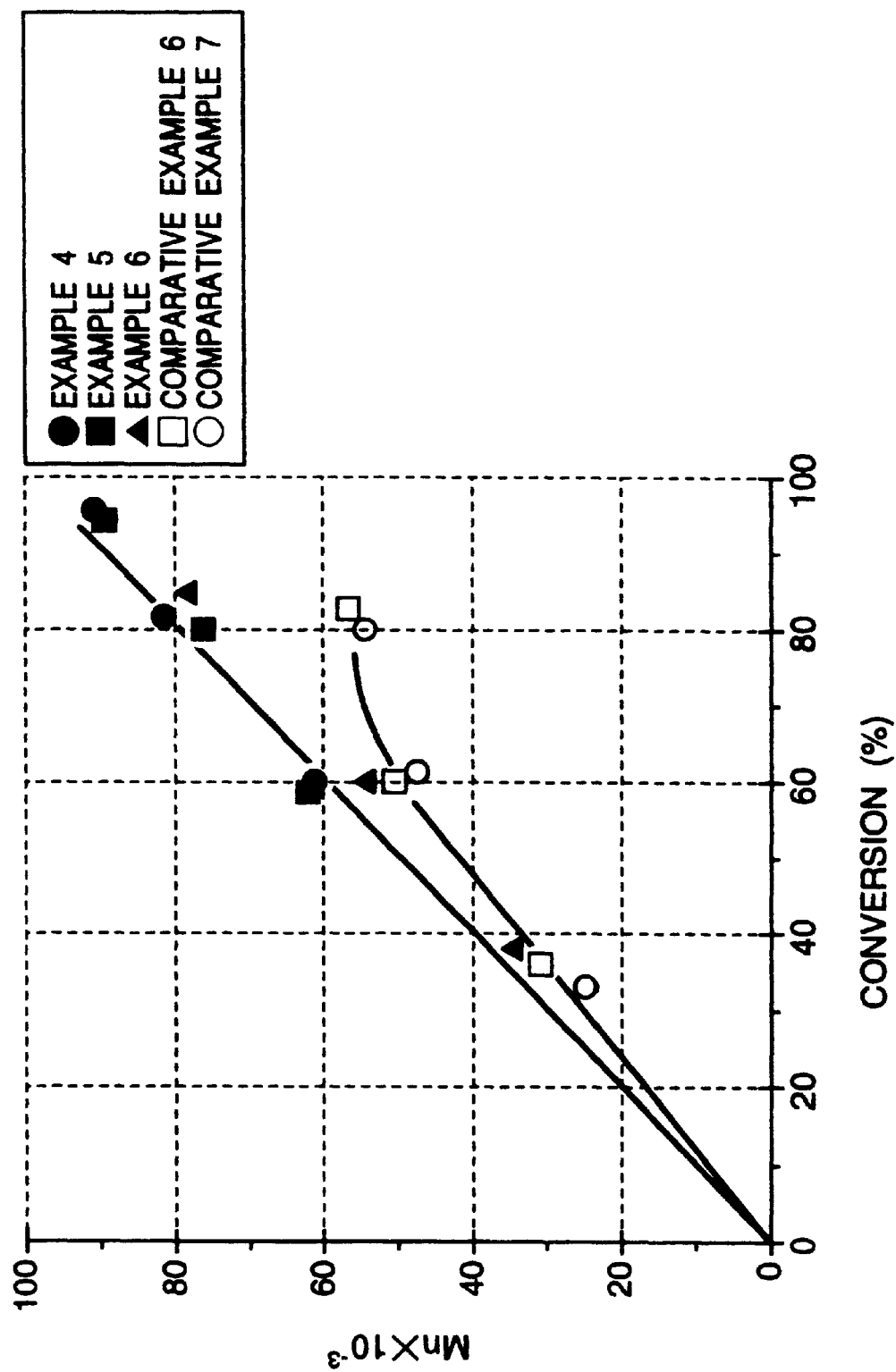
Figure 5:
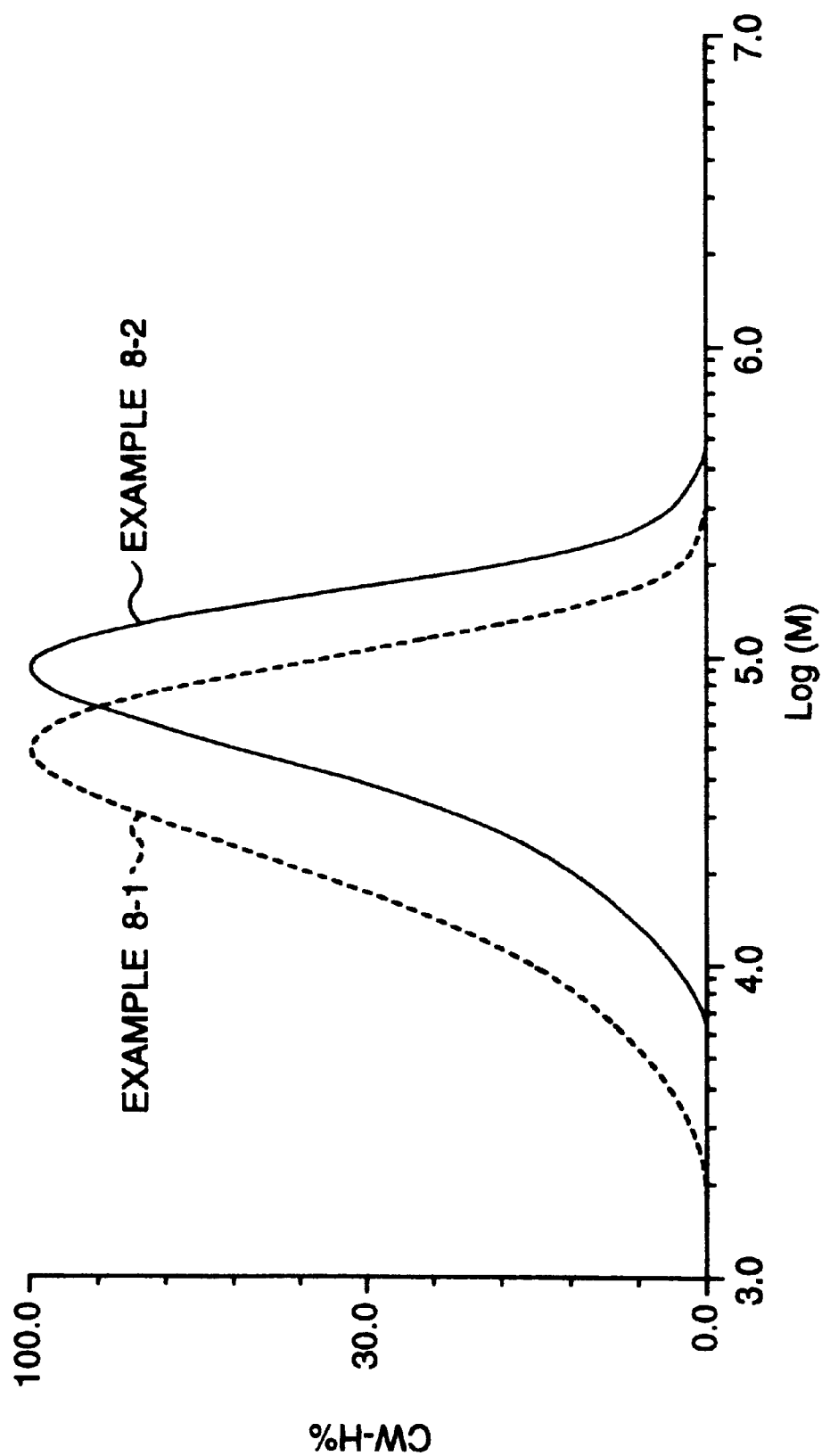
FIG. 5 shows GPC curves of the polymers obtained in the Examples.

From FIG. 4 showing the relation between Mn and conversion, it is seen that the molecular weight increased with progress of polymerization, and that living polymerization proceeded. It is noted that the molecular weight distribution was widened with increase of conversion. It is considered that this is not due to a decrease of living characteristics of the polymerization solution but is attributable to such factors as rise of viscosity of the polymerization solution and increase of the ratio of propagation rate to exchange reaction rate between the polymerization active point (Mg) and polymerization activator (Li). The molecular weight distribution patterns of Examples 8-1 and 8-2 are shown in FIG. 5, from which it is seen that the molecular weight distribution is generally shifted with progress of polymerization, and there exists no deactivated polymer.

Comparative Example 4

Polymerization was carried out in a region with a low concentration of SM relative to EB at Bu$_2$Mg/nBuLi=4. Although polymerization proceeded without causing a runaway reaction, the molecular weight distribution widened with progress of polymerization. GPC analysis showed pronounced tailing of the molecular weight distribution toward the low molecular weight side with the progress of polymerization, indicating that the active points were gradually deactivated in the course of polymerization (decrease of living polymerization activity).

Comparative Example 5

Polymerization was carried out under the conditions shown in Table 7. Progress of polymerization was very slow.

EXAMPLES 9–12

Polymerization was carried out under the conditions shown in Table 4 using cyclohexane as solvent and Bu$_2$Mg and nBuLi as initiators. Polymerization was conducted at 80° C. for 4 hours in the conversion range of 70% or less, then the temperature was raised to 120° C. and 30 minutes after polymerization was stopped. Polymerization had already been completed. In Example 12, however, polymerization had been completed in a polymerization time of 4 hours. The relation between Mn of the obtained polymer and [SM]/[Mg] ratio is shown in FIG. 6.

Comparative Examples 6–8

Polymerization was carried out under the conditions shown in Table 7 using cyclohexane as solvent and Bu$_2$Mg and nBuLi as initiators. Polymerization was performed at 50° C. in the conversion range of 70% or less, and then the temperature was raised to 80° C. to conclude polymerization. In Comparative Example 8, the internal temperature became slightly higher than the oil bath temperature in the early phase of polymerization. The relation between Mn of the obtained polymer and [SM]/[Mg] ratio is shown in FIG. 6.

Figure 6:
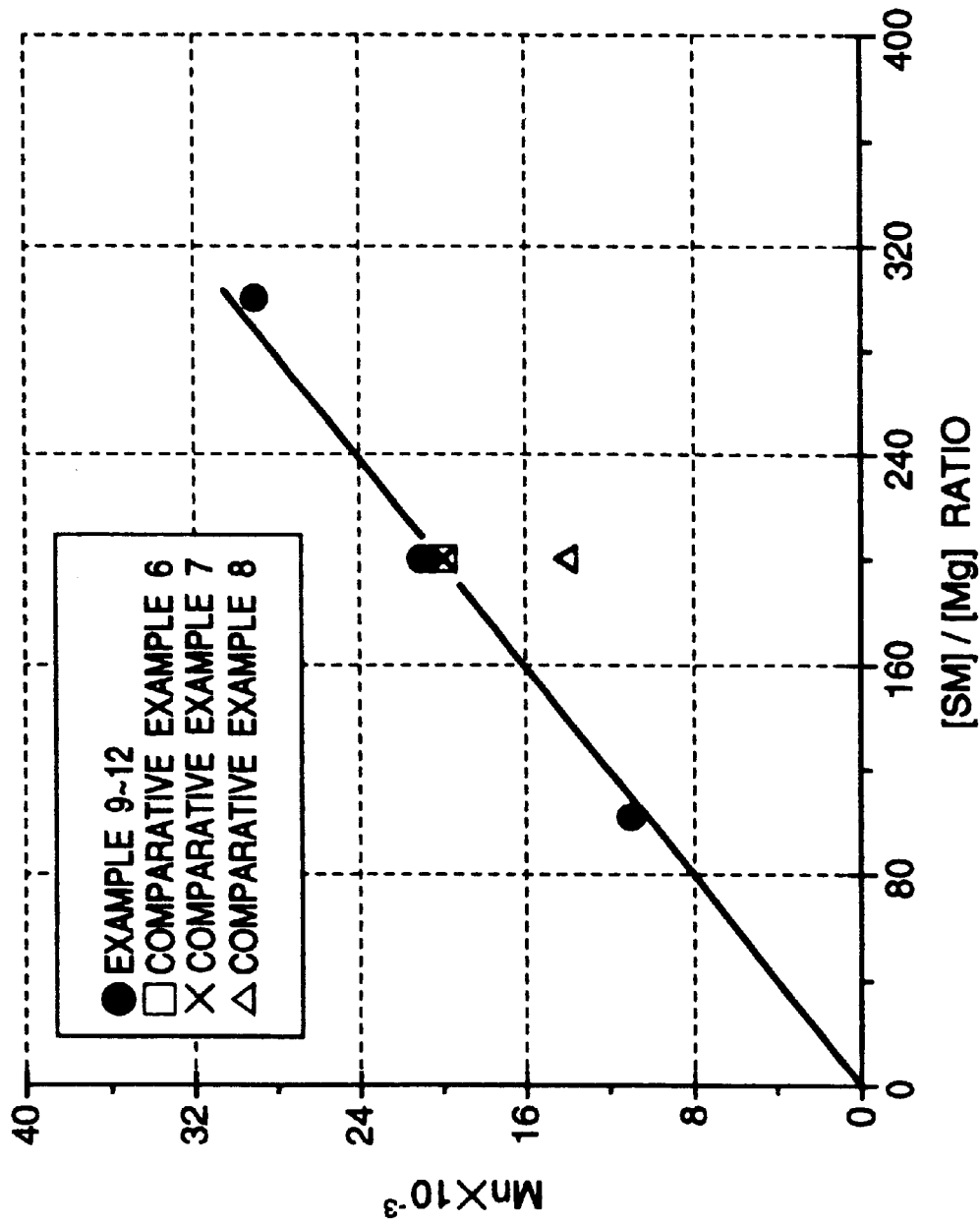
FIG. 6 is a graph showing the relation between the number-average molecular weight (Mn) of the polymers obtained in the Examples and Comparative Examples and the concentration ratio of the monomer and $Bu_2Mg$ ([SM]/[Mg]), which is the initial polymerization condition.

From the results of FIG. 6, it is apparent that Mn of the polymer is decided by the [SM]/[Mg] ratio in the region of [Mg]≧[Li].

Figure 7:
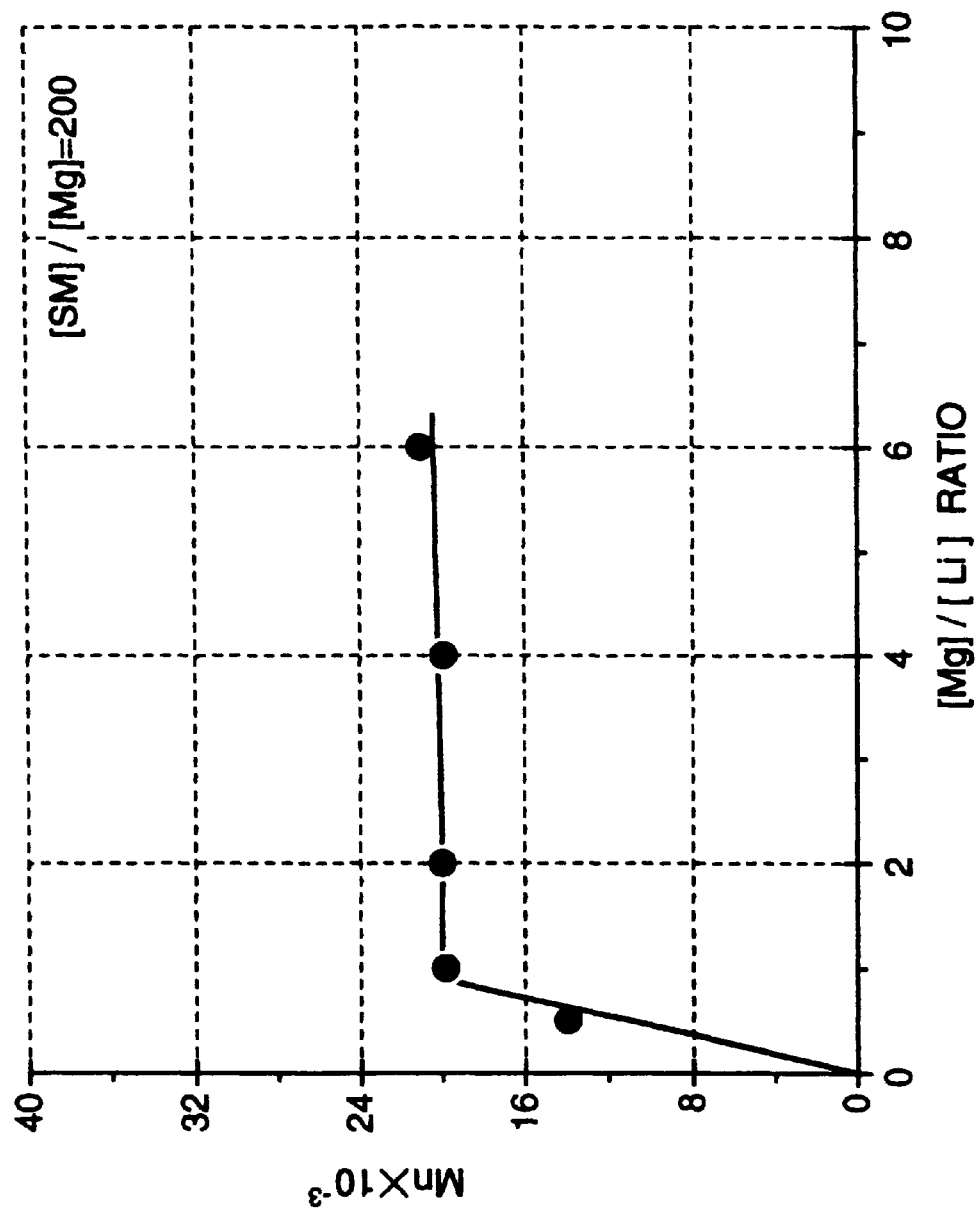
FIG. 7 is a graph showing the relation between the number-average molecular weight (Mn) of the polymers obtained in the Examples and Comparative Examples and the concentration ratio of $Bu_2Mg$ and BuLi ([Mg]/[Li]), which is the initial polymerization condition.

The relation between Mn and [Mg]/[Li] ratio is shown in FIG. 7. In the region of [Mg]≧[Li], the value of Mn of the polymer is constant regardless of the [Mg]/[Li] ratio, but in the region of [Mg]<[Li] the molecular weight is lowered.

H$^1$ and C$^{13}$ NMR analyses of the polymer obtained in the region of [Mg]≧[Li] confirmed that the butyl groups attached to the end of the molecular chain of the polymer were sec-butyl groups, that the number thereof was equal to the number of the benzyl protons at the polymerization termination ends, and that the value of Mn calculated from the number of sec-butyl groups substantially agreed with the value of Mn determined by GPC. From these facts, it was confirmed that the metal cation forming a counterpart to the carbonic anion at the polymerization active point was Mg.

EXAMPLES 13–14 AND COMPARATIVE EXAMPLES 9–10

Polymerization was carried out under the conditions shown in Tables 4 and 7 using EB as polymerization solvent and Bu$_2$Mg and nBuLi as initiators. In each case, polymerization was conducted under a condition designed to complete the polymerization in 240 minutes.

Figure 8:
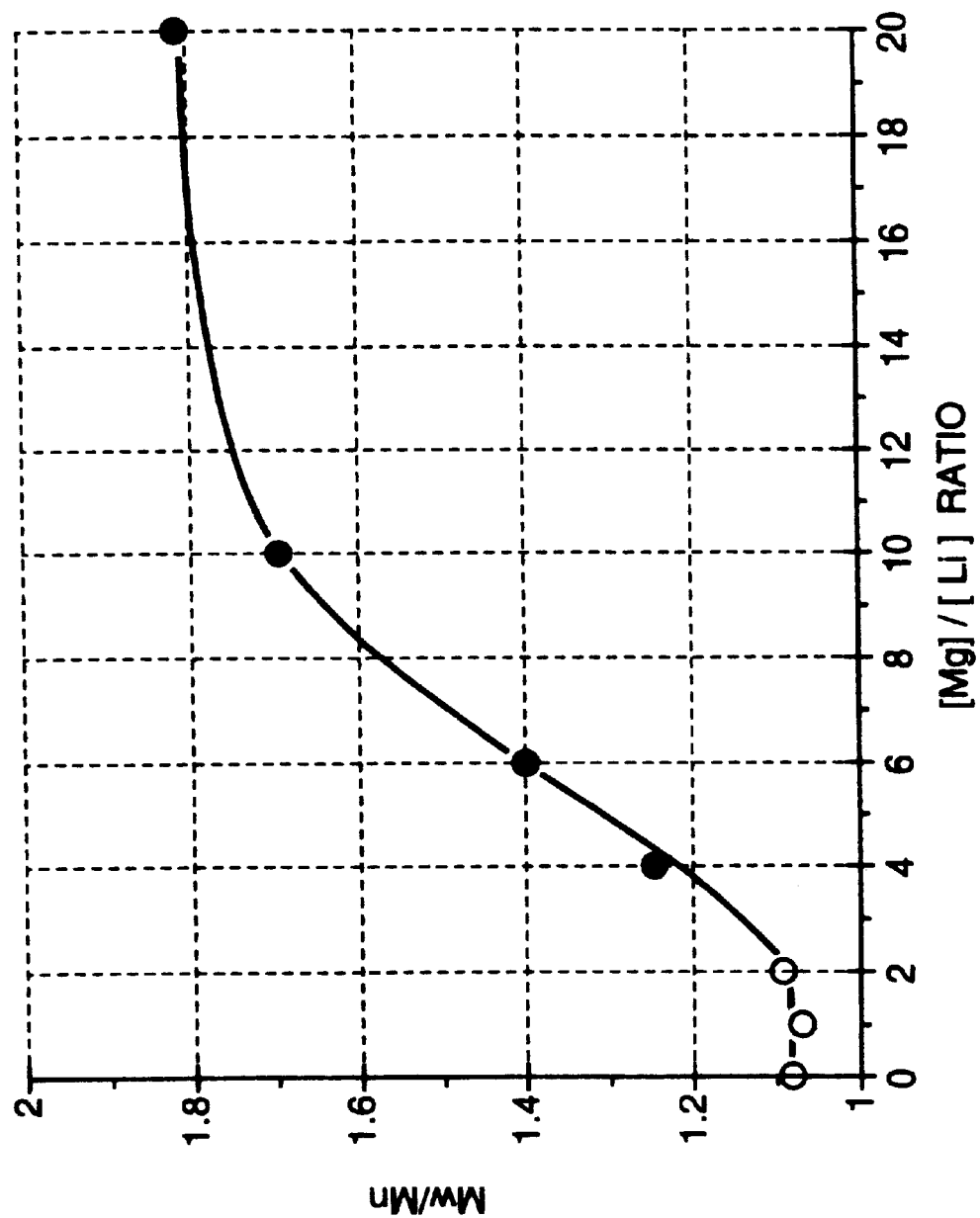
FIG. 8 is a graph showing the relation between the ratio (Mw/Mn) of weight-average molecular weight (Mw) and number-average molecular weight (Mn) of the polymers obtained in the Examples and Comparative Examples and the concentration ratio of $Bu_2Mg$ and BuLi ([Mg]/[Li]), which is the initial polymerization condition.

The relation between the molecular weight distribution of the polymer obtained from the polymerization of 240 minutes (a polymer having a conversion of 95% or more) and the [Mg]/[Li] ratio is shown in FIG. 8. The molecular weight distribution was narrow at [Mg]/[Li]≧2 but widened when the [Mg]/[Li] ratio was made equal to or greater than 4.

EXAMPLES 15 AND 17

Bu$_2$Mg and nBuOH or sBuOH were mixed at a molar ratio of 1:1 in EB, and nBuLi was added to the resulting solution at a [Mg]/[Li] ratio shown in Table 5. Polymerization was carried out by using this preparation as polymerization initiator. EB was used as polymerization solvent.

EXAMPLES 16, 18 AND 19 nBuLi and nBuOH or sBuOH or tBuOH were mixed in a molar ratio of 1:1 in EB, and nBuLi was added to the resulting solution at a [Mg]/[Li] ratio shown in Table 5. Polymerization was carried out using this preparation as polymerization initiator and EB as solvent.

EXAMPLE 20 nBuLi and nBuOH were mixed at a molar ratio of 1:1 in EB. In a separate container, $Bu_2Mg$ and nBuOH were mixed at a molar ratio of 1:1 in EB. Two solutions were mixed at a [Mg]/[Li] ratio shown in Table 6, and polymerization was carried out using the mixed solution as polymerization initiator and EB as solvent.

EXAMPLE 21

$Bu_2Mg$ and $Bu_2NH$ were mixed in a molar ratio of 1:1 in EB, and then nBuLi was added thereto at a [Mg]/[Li] ratio shown in Table 6. Polymerization was carried out using this preparation as polymerization initiator and EB as solvent.

EXAMPLES 22 AND 23 tBuONa or tBuOK powder was added to EB, and then $Bu_2Mg$ was mixed therewith at a $[Mg]/[M^1]$ ratio shown in Table 6. Polymerization was carried out using this preparation as polymerization initiator and EB as solvent.

The polymerization results of Examples 15–23 are shown in Table 6. In each case, living polymeriza-tion proceeded without causing a runaway reaction as in the case of the $Bu_2Mg$/BuLi initiator.

$R^3OH$ and $(R^3)_2NH$ were mixed in each initiator so that the $\{[R^3OH]+[(R^3)_2NH]\}/\{2\times[Mg]+[M^1]\}$ ratio would be quintuplicated, and each mixture was used as initiator, but polymerization was not initiated with any of these initiators.

EXAMPLES 24 AND 25

Dilute solutions of $Bu_2Mg$ and sBuLi or tBuLi were prepared at the mixing ratios shown in Table 8 in a nitrogen globe. EB was used as polymerization solvent. Polymerization was carried out under the condition shown in Table 8.

Figure 9:
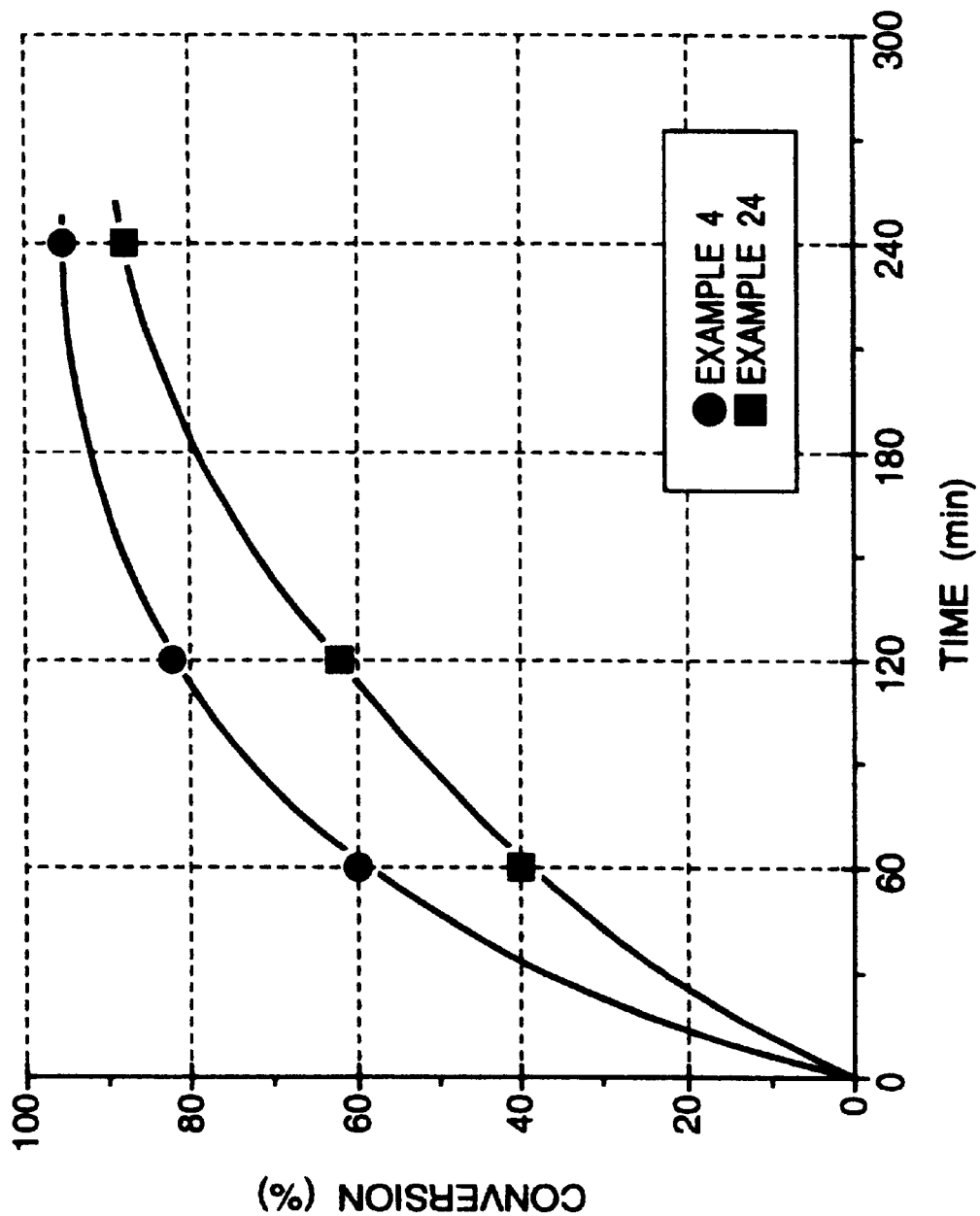

Polymerization was conducted under the same conditions as in Example 4, but the polymerization rate was lower and the molecular weight of the obtained polymer was also somewhat smaller. sBuLi and tBuLi showed completely the same polymerization behavior. The results of polymerization are shown in FIGS. 9 and 10.

EXAMPLE 26 nBuLi was added to EB, followed by further addition of SM at [SM]/[Li] of 2. The solution changed in color after a while. Then $Bu_2Mg$ was added at [Mg]/[Li] of 4 to prepare an initiator solution. Polymer-ization was carried out under the conditions shown in Table 8. The result was completely the same as when the process was initiated with $Bu_2Mg$/nBuLi.

EXAMPLE 27

$Bu_2Mg$ and sBuOH were mixed at a molar ratio of 1:1 in EB. Using this preparation as initiator, polymerization was carried out under the conditions shown in Table 8. Living polymerization proceeded without causing a runaway reaction.

EXAMPLE 28

$Bu_2Mg$ and $(Bu)_2NH$ were mixed at a molar ratio of 1:1 in EB, and using this preparation as initiator, polymerization was carried out under the conditions shown in Table 8. Living polymerization proceeded without causing a runaway reaction.

In the initiator solutions of Examples 27 and 28, sBuOH and $Bu_2Mg$, and $BU_2NH$ and $Bu_2Mg$, were mixed so as to satisfy $[sBuOH]/[Bu_2Mg]=10$ and $[Bu_2NH]/[Bu_2Mg]=10$. Polymerization was attempted by using these mixed initiators, but polymerization could not be initiated in each case.

Although the polymerization reaction was conducted at a high temperature in Examples 1–28, there was observed no peak of molecular weight attributable to radical polymerization.

EXAMPLE 29

High-temperature bulk polymerization of SM was carried out using a polymerization initiator $Bu_2Mg$/nBuLi (10/1) of the present invention in an extruder (ZSK-25 (L/D=47) mfd. by Werner Corp.).

The 11 blocks of the extruder were set at the following temperatures: block 1: room temperature; block 2: 120° C.; blocks 3 and 4: 140° C.; blocks 5 and 6: 160° C.; blocks 7 and 8: 200° C.; blocks 9–11: 220° C. A liquid-adding device was provided between the blocks 8 and 9, from which the polymerization terminator (a mixed solution of BuOH and EB) was supplied under pressure. The purified and dehydrated SM, EB and EB-diluted $Bu_2Mg$/nBuLi (10/1) initiators were stored in the respective containers under a closed nitrogen atmosphere. The materials in the respective containers can be fed into a tank provided with a 3-liter agitating element by a gear pump, and therefrom into the zone 1 of the extruder by another gear pump. The interior atmosphere of the extruder was well substituted with dry nitrogen and a mixed solution of EB and initiator was fed into the extruder to clean its interior. Then the concentration of SM was gradually raised to finally reach 100. The SM feed rate was set at 100 ml/min. The initiator was supplied in such an amount that [SM]/[Mg] would become 1,000. The polymer extruded from the die was immediately cooled in water and pelletized. The molecular weight of the produced polymer and its molecular weight distribution were as follows: Mn=91,000; Mw/Mn=3.5.

EXAMPLE 30 AND COMPARATIVE EXAMPLES 11 AND 12

Polymers were produced under the conditions shown in Table 9. Each polymer was dissolved in EB to a concentration of about 20% and part of the metal residues was extracted with distilled water. The metal contents of the polymers are shown in Table 9. Methanol was added to each polymer solution after washing to precipitate the polymer, and then the solution was dried in vacuo at 80° C. 0.2 g of each of the obtained polymers was put into a glass tube. The glass tubes were sealed in vacuo. The glass tubes were placed in a 280° C. oil bath for 10 minutes, 20 minutes and 40 minutes and then taken out. The taken-out glass tubes were put into water for cooling. The glass tubes were crushed and the contents were put into and dissolved in THF. The monomer formation rate was determined by gas chromatography using anthracene as an internal standard.

The results are shown in Table 10.

EXAMPLE 31

The polymer obtained in Example 29 was subjected to an extrusion foaming test using Freon 12. The rate of the open cells in the obtained foam was determined according to ASTM-2856. The monomers contained in the obtained foam were also determined. The results are shown in Tables 11 and 12.

Comparative Example 13

Using uBuLi as initiator and EB as solvent, polymerization was carried out at an SM concentration of 50 vol % in a 100-liter autoclave. The polymerization temperature rose to 145° C. The solvent was removed from the obtained polymer solution by a drum dryer. The polymer was then put into an extruder having a cylinder temperature of 220° C. and the residual EB was vented away. The polymer was recovered as pellets. The results are shown in Tables 11 and 12.

Comparative Example 14

A polymer obtained from radical polymerization was extrusion foamed in the same way as in Example 31, and the open cell rate and monomer content of the obtained foam were examined. The results are shown in Tables 11 and 12.

This application is based on Japanese Patent Application No. 8-084474 filed in Japan on Mar. 14, 1996, Japanese Patent Application No. 8-303483 filed in Japan on Oct. 30, 1996, and Japanese Patent Applica-tion No. 8-303484 filed in Japan on Oct. 30, 1996, the contents of which are incorporated hereinto in its entirety by reference.

TABLE 1

|  | [SM] (vol %) | [Bu$_2$Mg] (mM) | Polymerization temperature* (° C.) | Polymerization time (min) | Conv. (%) | Mn (× 10$^{-3}$) | Mw (× 10$^{-3}$) | Mw/Mn |
|---|---|---|---|---|---|---|---|---|
| Example 1-1 | 50 | 5.16 | 150 | 60 | 19 | 12 | 19 | 1.62 |
| Example 1-2 | 50 | 5.16 | 150 | 120 | 27 | 18 | 30 | 1.65 |
| Example 1-3 | 50 | 5.16 | 150 | 240 | 42 | 25 | 42 | 1.68 |
| Example 2-1 | 80 | 2.58 | 150 | 60 | 22 | 42 | 63 | 1.51 |
| Example 2-2 | 80 | 2.58 | 150 | 120 | 36 | 83 | 134 | 1.62 |
| Example 2-3 | 80 | 2.58 | 150 | 240 | 58 | 125 | 210 | 1.68 |
| Example 3-1 | 80 | 2.58 | 120 | 120 | 10 | 20 | 27 | 1.40 |
| Example 3-2 | 80 | 2.58 | 120 | 240 | 20 | 38 | 56 | 1.48 |
| Example 3-3 | 80 | 2.58 | 120 | 480 | 33 | 61 | 92 | 1.50 |

*EB was used as solvent.

TABLE 2

|  | [SM] (vol %) | [Bu$_2$Mg] (mM) | Polymerization temperature* (° C.) | Polymerization time (min) | Conv. (%) | Mn (× 10$^{-3}$) | Mw (× 10$^{-3}$) | Mw/Mn |
|---|---|---|---|---|---|---|---|---|
| Comp. Example 1 | 50 | *1 | 120 | *2 | 100 | 183 | 198 | 1.08 |
| Comp. Example 2-1 | 20 | 2.06 | 150 | 60 | 15 | 10 | 17 | 1.71 |
| Comp. Example 2-2 | 20 | 2.06 | 150 | 120 | 23 | 14 | 25 | 1.82 |
| Comp. Example 2-3 | 20 | 2.06 | 150 | 240 | 38 | 18 | 38 | 2.10 |
| Comp. Example 3-1 | 50 | 0 | 150 | 120 | 29 | 92 | 212 | 2.30 |
| Comp. Example 3-2 | 50 | 0 | 150 | 240 | 43 | 92 | 207 | 2.25 |

*EB was used as solvent.
*1 2.56 mM of BuLi was added in place of Bu$_2$Mg.
*2 Runaway reaction occurred in the polymerization solution, and polymerization was concluded within one minute.

TABLE 3

|  | [SM] (vol %) | [Bu$_2$Mg] (mM) | [Bu$_2$Mg]/[BuLi] | Polymerization temperature (° C.) | Polymerization time (min) | Conv. (%) | Mn (× 10$^{-3}$) | Mw (× 10$^{-3}$) | Mw/Mn |
|---|---|---|---|---|---|---|---|---|---|
| Example 4-1 | 80 | 6.9 | 4 | 80 | 60 | 60 | 70 | 82 | 1.17 |
| Example 4-2 | 80 | 6.9 | 4 | 80 | 120 | 82 | 82 | 101 | 1.23 |
| Example 4-3 | 80 | 6.9 | 4 | 80 | 240 | 96 | 91 | 114 | 1.25 |
| Example 5-1 | 90 | 7.8 | 6 | 90 | 60 | 59 | 62 | 73 | 1.18 |
| Example 5-2 | 90 | 7.8 | 6 | 90 | 120 | 80 | 77 | 95 | 1.24 |
| Example 5-3 | 90 | 7.8 | 6 | 90 | 240 | 95 | 90 | 126 | 1.40 |
| Example 6-1 | 90 | 7.8 | 10 | 100 | 60 | 38 | 35 | 43 | 1.23 |

TABLE 3-continued

|  | [SM] (vol %) | [Bu₂Mg] (mM) | $\frac{[Bu_2Mg]}{[BuLi]}$ | Polymerization temperature (° C.) | Polymerization time (min) | Conv. (%) | Mn (× 10⁻³) | Mw (× 10⁻³) | Mw/Mn |
|---|---|---|---|---|---|---|---|---|---|
| Example 6-2 | 90 | 7.8 | 10 | 100 | 120 | 60 | 55 | 74 | 1.35 |
| Example 6-3 | 90 | 7.8 | 10 | 100 | 240 | 85 | 79 | 130 | 1.65 |
| Example 7-1 | 100 | 8.6 | 20 | 110 | 60 | 36 | 31 | 43 | 1.40 |
| Example 7-2 | 100 | 8.6 | 20 | 110 | 120 | 60 | 51 | 77 | 1.51 |
| Example 7-3 | 100 | 8.6 | 20 | 110 | 240 | 83 | 57 | 98 | 1.72 |
| Example 8-1 | 100 | 8.6 | 30 | 120 | 60 | 33 | 25 | 44 | 1.76 |
| Example 8-2 | 100 | 8.6 | 30 | 120 | 120 | 61 | 48 | 85 | 1.78 |
| Example 8-3 | 100 | 8.6 | 30 | 120 | 240 | 80 | 55 | 104 | 1.90 |

TABLE 4

|  | [SM] (vol %) | [Bu₂Mg] (mM) | $\frac{[Bu_2Mg]}{[BuLi]}$ | Polymerization temperature* (° C.) | Polymerization time (min) | Conv. (%) | Mn (× 10⁻³) | Mw (× 10⁻³) | Mw/Mn |
|---|---|---|---|---|---|---|---|---|---|
| Example 9-1 | 80 | 69 | 6 | 80 | 240 | 72 | 7.5 | 8.8 | 1.18 |
| Example 9-2 | 80 | 69 | 6 | 80 → 120 | 240 + 30 | 100 | 11 | 13 | 1.17 |
| Example 10-1 | 80 | 35 | 6 | 80 | 240 | 65 | 14 | 16 | 1.17 |
| Example 10-2 | 80 | 35 | 6 | 80 → 120 | 240 + 30 | 100 | 21 | 24 | 1.17 |
| Example 11-1 | 80 | 23 | 6 | 80 | 240 | 60 | 17 | 20 | 1.17 |
| Example 11-2 | 80 | 23 | 6 | 80 → 120 | 240 + 30 | 100 | 29 | 34 | 1.16 |
| Example 12 | 80 | 35 | 4 | 80 | 240 | 100 | 20 | 23 | 1.17 |
| Example 13 | 100 | 6.9 | 10 | 100 | 240 | 100 | 88 | 150 | 1.70 |
| Example 14 | 100 | 6.9 | 20 | 120 | 240 | 100 | 70 | 127 | 1.81 |

*Cyclohexane was used as solvent.

TABLE 5

|  | Initiator | Component ratio | [SM] (vol %) | [Mg] (mM) | $\frac{[Mg]}{[Li]}$ | Polymerization temperature (° C.) | Polymerization time (min) | Conv. (%) | Mn (× 10⁻³) | Mw (× 10⁻³) | Mw/Mn |
|---|---|---|---|---|---|---|---|---|---|---|---|
| Example 15-1 | nBuLi/Bu₂Mg/nBuOH | 1/6/6 | 90 | 7.8 | 6 | 90 | 60 | 53 | 49 | 58 | 1.19 |
| Example 15-2 | nBuLi/Bu₂Mg/nBuOH | 1/6/6 | 90 | 7.8 | 6 | 90 | 120 | 78 | 74 | 90 | 1.22 |
| Example 15-3 | nBuLi/Bu₂Mg/nBuOH | 1/6/6 | 90 | 7.8 | 6 | 90 | 240 | 93 | 89 | 117 | 1.32 |
| Example 16-1 | nBuLi/Bu₂Mg/nBuOH | 1/6/1 | 90 | 7.8 | 6 | 90 | 60 | 44 | 42 | 48 | 1.15 |
| Example 16-2 | nBuLi/Bu₂Mg/nBuOH | 1/6/1 | 90 | 7.8 | 6 | 90 | 120 | 71 | 68 | 82 | 1.20 |
| Example 16-3 | nBuLi/Bu₂Mg/nBuOH | 1/6/1 | 90 | 7.8 | 6 | 90 | 240 | 90 | 85 | 107 | 1.26 |
| Example 17-1 | nBuLi/Bu₂Mg/sBuOH | 1/10/10 | 90 | 7.8 | 10 | 100 | 60 | 68 | 63 | 88 | 1.40 |
| Example 17-2 | nBuLi/Bu₂Mg/sBuOH | 1/10/10 | 90 | 7.8 | 10 | 100 | 120 | 90 | 80 | 131 | 1.64 |
| Example 17-3 | nBuLi/Bu₂Mg/sBuOH | 1/10/10 | 90 | 7.8 | 10 | 100 | 240 | 10 | 90 | 154 | 1.71 |
| Example 18-1 | nBuLi/Bu₂Mg/sBuOH | 1/6/1 | 90 | 7.8 | 6 | 100 | 60 | 63 | 56 | 76 | 1.36 |
| Example 18-2 | nBuLi/Bu₂Mg/sBuOH | 1/6/1 | 90 | 7.8 | 6 | 100 | 120 | 85 | 79 | 130 | 1.64 |
| Example 18-3 | nBuLi/Bu₂Mg/sBuOH | 1/6/1 | 90 | 7.8 | 6 | 100 | 240 | 99 | 90 | 153 | 1.70 |
| Example 19-1 | nBuLi/Bu₂Mg/tBuOH | 1/6/1 | 90 | 7.8 | 6 | 100 | 60 | 90 | 81 | 133 | 1.64 |
| Example 19-2 | nBuLi/Bu₂Mg/tBuOH | 1/6/1 | 90 | 7.8 | 6 | 100 | 120 | 10 | 90 | 153 | 1.70 |

TABLE 6

|  | Initiator | Component ratio | [SM] (vol %) | [Mg] (mM) | $\frac{[Mg]}{[Li]}$ | Polymerization temperature (° C.) | Polymerization time (min) | Conv. (%) | Mn (× 10⁻³) | Mw (× 10⁻³) | Mw/Mn |
|---|---|---|---|---|---|---|---|---|---|---|---|
| Example 20-1 | nBuLi/Bu₂Mg/nBuOH | 1/10/11 | 90 | 7.8 | 10 | 100 | 60 | 37 | 34 | 42 | 1.23 |
| Example 20-2 | nBuLi/Bu₂Mg/nBuOH | 1/10/11 | 90 | 7.8 | 10 | 100 | 120 | 59 | 54 | 73 | 1.36 |
| Example 20-3 | nBuLi/Bu₂Mg/nBuOH | 1/10/11 | 90 | 7.8 | 10 | 100 | 240 | 84 | 79 | 131 | 1.66 |
| Example 21-1 | nBuLi/Bu₂Mg/Bu₂NH | 1/10/10 | 90 | 7.8 | 10 | 100 | 60 | 70 | 65 | 92 | 1.42 |
| Example 21-2 | nBuLi/Bu₂Mg/Bu₂NH | 1/10/10 | 90 | 7.8 | 10 | 100 | 120 | 91 | 81 | 134 | 1.66 |
| Example 21-3 | nBuLi/Bu₂Mg/Bu₂NH | 1/10/10 | 90 | 7.8 | 10 | 100 | 240 | 100 | 90 | 156 | 1.73 |
| Example 22-1 | tBuONa/Bu₂Mg | 1/6 | 90 | 7.8 | 6 | 80 | 60 | 60 | 59 | 67 | 1.14 |
| Example 22-2 | tBuONa/Bu₂Mg | 1/6 | 90 | 7.8 | 6 | 80 | 120 | 82 | 79 | 95 | 1.20 |
| Example 22-3 | tBuONa/Bu₂Mg | 1/6 | 90 | 7.8 | 6 | 80 | 240 | 98 | 95 | 121 | 1.27 |
| Example 23-1 | tBuOK/Bu₂Mg | 1/10 | 90 | 7.8 | 10 | 80 | 60 | 62 | 60 | 82 | 1.36 |

TABLE 6-continued

| | Initiator | Component ratio | [SM] (vol %) | [Mg] (mM) | [Mg]/[Li] | Polymerization temperature (° C.) | Polymerization time (min) | Conv. (%) | Mn (× 10⁻³) | Mw (× 10⁻³) | Mw/Mn |
|---|---|---|---|---|---|---|---|---|---|---|---|
| Example 23-2 | tBuOK/Bu₂Mg | 1/10 | 90 | 7.8 | 10 | 80 | 120 | 83 | 80 | 132 | 1.65 |
| Example 23-3 | tBuOK/Bu₂Mg | 1/10 | 90 | 7.8 | 10 | 80 | 240 | 99 | 91 | 156 | 1.71 |

TABLE 7

| | [SM] (vol %) | [Bu₂Mg] (mM) | [Bu₂Mg]/[BuLi] | Polymerization temperature (° C.) | Polymerization time (min) | Conv. (%) | Mn (× 10⁻³) | Mw (× 10⁻³) | Mw/Mn |
|---|---|---|---|---|---|---|---|---|---|
| Comp. Example 4-1 | 10 | 0.9 | 4 | 80 | 60 | 19 | 18 | 22 | 1.21 |
| Comp. Example 4-2 | 10 | 0.9 | 4 | 80 | 120 | 38 | 33 | 43 | 1.30 |
| Comp. Example 4-3 | 10 | 0.9 | 4 | 80 | 240 | 62 | 45 | 70 | 1.55 |
| Comp. Example 5-1 | 10 | 4.3 | 6 | 25 | 120 | 1 | ND | ND | ND |
| Comp. Example 5-2 | 50 | 4.3 | 6 | 25 | 240 | 3 | ND | ND | ND |
| Comp. Example 5-3 | 50 | 4.3 | 6 | 25 | 480 | 6 | 0.7 | 0.8 | 1.17 |
| Comp. Example 6-1 | 50 | 22 | 2 | 50 | 240 | 71 | 16 | 17 | 1.09 |
| Comp. Example 6-2 | 50 | 22 | 2 | 50 → 80 | 240 → 60 | 100 | 20 | 22 | 1.10 |
| Comp. Example 7-1 | 50 | 22 | 1 | 50 | 240 | 62 | 13 | 14 | 1.07 |
| Comp. Example 7-2 | 50 | 22 | 1 | 50 → 80 | 240 → 60 | 100 | 20 | 22 | 1.08 |
| Comp. Example 8 | 30 | 13 | 0.5 | 30 | 60 | 100 | 14 | 16 | 1.14 |
| Comp. Example 9 | 80 | 6.9 | 2 | 80 | 240 | 95 | 105 | 114 | 1.09 |
| Comp. Example 10 | 80 | 6.9 | 1 | 25 | 240 | 100 | 110 | 118 | 1.07 |

TABLE 8

| | Initiator | [SM] (vol %) | [Mg] (mM) | [Mg]/[Li] | Polymerization temperature (° C.) | Polymerization time (min) | Conv. (%) | Mn (× 10⁻³) | Mw (× 10⁻³) | Mw/Mn |
|---|---|---|---|---|---|---|---|---|---|---|
| Example 24-1 | Bu₂Mg/sBuLi | 80 | 6.9 | 4 | 80 | 60 | 40 | 32 | 36 | 1.13 |
| Example 24-2 | Bu₂Mg/sBuLi | 80 | 6.9 | 4 | 80 | 120 | 63 | 47 | 55 | 1.16 |
| Example 24-3 | Bu₂Mg/sBuLi | 80 | 6.9 | 4 | 80 | 240 | 89 | 68 | 84 | 1.24 |
| Example 25-1 | Bu₂Mg/tBuLi | 80 | 6.9 | 4 | 80 | 60 | 40 | 32 | 36 | 1.13 |
| Example 25-2 | Bu₂Mg/tBuLi | 80 | 6.9 | 4 | 80 | 120 | 63 | 47 | 55 | 1.16 |
| Example 25-3 | Bu₂Mg/tBuLi | 80 | 6.9 | 4 | 80 | 240 | 89 | 68 | 84 | 1.24 |
| Example 26-1 | Bu₂Mg/StLi | 80 | 6.9 | 4 | 80 | 60 | 60 | 70 | 82 | 1.17 |
| Example 26-2 | Bu₂Mg/StLi | 80 | 6.9 | 4 | 80 | 120 | 82 | 82 | 101 | 1.23 |
| Example 26-3 | Bu₂Mg/StLi | 80 | 6.9 | 4 | 80 | 240 | 96 | 91 | 114 | 1.25 |
| Example 27-1 | Bu₂Mg/sBuOH (1/1) | 100 | 8.6 | — | 150 | 60 | 50 | 47 | 66 | 1.40 |
| Example 27-2 | Bu₂Mg/sBuOH (1/1) | 100 | 8.6 | — | 150 | 120 | 76 | 74 | 104 | 1.41 |
| Example 27-3 | Bu₂Mg/sBuOH (1/1) | 100 | 8.6 | — | 150 | 240 | 90 | 85 | 120 | 1.41 |
| Example 28-1 | Bu₂Mg/Bu₂NH (1/1) | 100 | 8.6 | — | 150 | 60 | 40 | 37 | 55 | 1.50 |
| Example 28-2 | Bu₂Mg/Bu₂NH (1/1) | 100 | 8.6 | — | 150 | 120 | 58 | 55 | 82 | 1.50 |
| Example 28-3 | Bu₂Mg/Bu₂NH (1/1) | 100 | 8.6 | — | 150 | 240 | 83 | 39 | 59 | 1.51 |

TABLE 9

| | Initiator | [SM] (vol %) | [Mg] (mM) | [Mg]/[Li] | Polymerization temperature (° C.) | Polymerization time (min) | Conv. (%) | Mn (× 10⁻³) | Mw (× 10⁻³) | Mw/Mn | Amount of metals after washing of polymer | | |
|---|---|---|---|---|---|---|---|---|---|---|---|---|---|
| | | | | | | | | | | | Mg | Li | Mg/Li |
| Example 30 | Bu$_2$Mg/nBuLi (6/1) | 100 | 8.6 | 6 | 80 → 120 | 120 → 30 | 100 | 95 | 103 | 1.09 | 25 | 4 | 6.3 |
| Comp. Example 11 | nBuLi | 50 | 4.3 | 0 | 80 | ~1 | 100 | 94 | 127 | 1.35 | — | 30 | — |
| Comp. Example 12 | None | 100 | — | — | 120 | 240 | 21 | 250 | 437 | 1.75 | | | |

Notes:
In Example 30, polymerization was first carried out at 80° C. for 120 minutes and then further conducted at 120° C. for 30 minutes. EB was used as polymerization solvent in Example 30 and Comparative Example 11.
In Comparative Example 11, runaway reaction took place and the internal temperature ultimately rose to 150–160° C.
In Comparative Example 12, radical polymerization was carried out. Unreacted monomer was removed by reprecipitating the polymer in methanol.

TABLE 10

| | SM concentration in polymer after heat retention test* | | |
|---|---|---|---|
| | Retention time | | |
| | 10 | 20 | 40 |
| Example 30 | 38 | 95 | 200 |
| Comp. Example 11 | 90 | 190 | 410 |
| Comp. Example 12 | 140 | 265 | 530 |

*Unit: ppm

TABLE 11

| | Polymer characteristics | | | Content in polymer (ppm) | |
|---|---|---|---|---|---|
| | Mn × 10⁻³ | Mw × 10⁻³ | Mw/Mn | SM | Trimer |
| Example 31 | 91 | 319 | 3.5 | 10 | 52 |
| Comp. Example 13 | 254 | 305 | 1.2 | 16 | 75 |
| Comp. Example 14 | 96 | 328 | 3.4 | 450 | 1810 |

TABLE 12

| | Amount | Foam characteristics | | |
|---|---|---|---|---|
| | of SM existing in foam | Foaming rate | Form diameter (mm) | Ratio of open cells |
| Example 31 | 21 | 16 | 22 | 94 |
| Comp. Example 13 | 28 | 12 | 21 | 38 |
| Comp. Example 14 | 558 | 15 | 22 | 93 |

What is claimed is:

1. A process for producing a vinyl polymer comprising: a polymerizing step wherein a vinyl monomer is polymerized in a polymerization solvent to form a vinyl polymer, wherein said polymerizing step is performed by anionic polymerization at a polymerization temperature which is 45° C. to 250° C., and wherein the concentration of the vinyl monomer based on the polymerization solvent is 45–100% by weight, wherein during the polymerization step, there is a propagating species which is a carbonic anion, and said carbonic anion has a cationic counterpart which is a metal consisting essentially of Mg and M$^1$, wherein M$^1$ is at least one alkali metal selected from the group consisting of Li, Na and K, and the molar concentrations of Mg and Ml satisfy the relation of (Mg)/(M$^1$) ≧ 4.

2. The process according to claim 1 further comprising a polymerization initiator wherein the polymerization initiator comprises (R$^2$)$_2$Mg wherein R$^2$ is a hydrocarbon group.

3. The process according to claim 1 wherein organic compounds represented by (R$^2$)$_2$Mg and R$^1$M$^1$ and/or R$^1$OM$^1$ wherein R$^1$ and R$^2$ are each a hydrocarbon group, O is an oxygen atom and M$^1$ is at least one alkali metal selected from the group consisting of Li, Na and K are used as polymerization initiator, and the molar concentrations of Mg and M$^1$ satisfy the relation of (Mg)/(M$^1$) ≧ 4.

4. The process according to claim 1 wherein, said molar concentrations satisfy the relation of (Mg)/(M$^1$)=10–100.

5. The process according to claim 3 wherein said organic compounds further comprise R$^3$OH and/or (R$^3$)$_2$NH wherein R$^3$ is a hydrocarbon group, O is an oxygen atom, N is a nitrogen atom and wherein the following is satisfied: 2×(Mg)+(M$^1$)>(R$^3$OH)+((R$^3$)$_2$NH).

6. The process according to claim 1 wherein the polymerization temperature in the region of conversion of the vinyl monomer of 0–70% is not lower than 45° C. and not higher than 200° C.

7. The process according to claim 3 wherein in the organic compounds represented by (R$^2$)$_2$Mg and R$^1$M$^1$, at least one of the carbons attached to the metals of the hydrocarbon groups R$^1$ and R$^2$ is a secondary carbon and/or tertiary carbon, and the total amount (R$^{1,2}$) of R$^1$ and R$^2$ of the secondary carbon and/or tertiary carbon satisfies the relation of (R$^{1,2}$) ≧ (Mg).

8. The process according to claim 7 wherein in the organic compounds represented by (R$^2$)$_2$Mg and R$^1$M$^1$, at least one of the hydrocarbon groups R$^1$ and R$^2$ is a polymer carbonic anion.

9. The process according to claim 1 wherein compounds represented by (R$^2$)$_2$Mg and R$^3$OH and/or (R$^3$)$_2$NH wherein R$^2$ and R$^3$ are each a hydrocarbon group, O is an oxygen atom and N is a nitrogen atom are used as polymerization initiator by mixing them so as to satisfy the relation of 2×(Mg)>(R$^3$OH)+((R$^3$)$_2$NH).

10. The process according to claim 1 wherein the polymerization solvent is a hydrocarbon compound.

11. The process according to claim 1 wherein the concentration of the vinyl monomer based on the polymerization solvent is substantially 100% by weight.

12. The process according to claim 1 wherein the polymerization reaction is conducted in an extruder.

13. A vinyl monomer polymerization initiator which comprises organic metal compounds represented by $(R^2)_2Mg$ and $R^1M^1$ and $R^1OM^1$ wherein $R^1$ and $R^2$ are each a hydrocarbon group, O is an oxygen atom and $M^1$ is at least one alkali metal selected from the group consisting of Li, Na and K, and the molar concentrations of the metals satisfy the relation of $(Mg)/(M^1) \geqq 4$.

14. A vinyl monomer polymerization initiator which comprises organic metal compounds represented by $(R^2)_2Mg$ and $R^1M^1$ and/or $R^1OM^1$ wherein $R^1$ and $R^2$ are each a hydrocarbon group, O is an oxygen atom and $M^1$ is at least one alkali metal selected from the group consisting of Li, Na and K, and the molar concentrations of the metals satisfy the relation of $(Mg)/(M^1)=10–100$.

15. A vinyl monomer polymerization initiator comprising compounds represented by $(R^2)_2Mg$ and $R^1M^1$ and $R^3OH$ and/or $(R^3)_2NH$ wherein $R^1$, $R^2$ and $R^3$ are each a hydrocarbon group, O is an oxygen atom and N is a nitrogen atom and $M^1$ is at least one alkali metal selected from the group consisting of Li, Na and K, and satisfying the relations of $(Mg)>(M^1)$ and $2\times(Mg)+(M^1)>(R^3OH)+((R^3)_2NH)$.

16. A vinyl monomer polymerization initiator comprising compounds represented by $(R^2)_2Mg$ and $R^3OH$ and/or $(R^3)_2NH$ wherein $R^2$ and $R^3$ are each a hydrocarbon group, O is an oxygen atom and N is a nitrogen atom, and satisfying the relation of $2\times(Mg)>(R^3OH)+((R^3)_2NH)$.

17. A vinyl polymer prepared by the process set forth in claim 1.

18. A styrene resin composition comprising a styrene polymer obtained by anionic polymerization, wherein its molecular weight distribution Mw/Mn is 2.0–10.0 and wherein the content of the trimer originating in the styrene monomer is 250 ppm or less.

19. A molded article obtained by injection molding or extrusion molding the vinyl polymer set forth in claim 17.

20. A molded article obtained by injection molding or extrusion molding the styrene resin composition set forth in claim 18.

* * * * *